(12) United States Patent
Abbaszadeh et al.

(10) Patent No.: US 12,230,958 B2
(45) Date of Patent: Feb. 18, 2025

(54) SYSTEMS AND METHODS FOR RAPIDLY RESPONDING TO COMMANDED POWER PROFILES

(71) Applicant: General Electric Company, Schenectady, NY (US)

(72) Inventors: Masoud Abbaszadeh, Clifton Park, NY (US); Pierino Gianni Bonanni, Loudonville, NY (US); Reza Ghaemi, Watervliet, NY (US)

(73) Assignee: GE DIGITAL HOLDINGS LLC, San Ramon, CA (US)

( * ) Notice: Subject to any disclaimer, the term of this patent is extended or adjusted under 35 U.S.C. 154(b) by 705 days.

(21) Appl. No.: 17/274,980

(22) PCT Filed: Sep. 13, 2018

(86) PCT No.: PCT/US2018/050903
§ 371 (c)(1),
(2) Date: Mar. 10, 2021

(87) PCT Pub. No.: WO2020/055411
PCT Pub. Date: Mar. 19, 2020

(65) Prior Publication Data
US 2022/0037916 A1 Feb. 3, 2022

(51) Int. Cl.
*F25B 49/02* (2006.01)
*B29C 64/205* (2017.01)
(Continued)

(52) U.S. Cl.
CPC ...... *H02J 13/00002* (2020.01); *G05B 13/041* (2013.01); *G05B 13/048* (2013.01)

(58) Field of Classification Search
CPC .................. G05B 13/041; G05B 13/048
(Continued)

(56) References Cited

U.S. PATENT DOCUMENTS

| 7,333,880 B2 | 2/2008 | Brewster et al. |
| 8,260,468 B2 * | 9/2012 | Ippolito ................ G06Q 50/06 700/297 |

(Continued)

FOREIGN PATENT DOCUMENTS

| CN | 102437653 B | 3/2015 |
| EP | 2369538 A1 | 9/2011 |

(Continued)

OTHER PUBLICATIONS

Brooks et al., "Demand Dispatch", IEEE Power and Energy Magazinec, vol. 8, Issue: 3, pp. 20-29, May-Jun. 2010.

(Continued)

*Primary Examiner* — Md Azad
(74) *Attorney, Agent, or Firm* — Armstrong Teasdale LLP

(57) ABSTRACT

A method for controlling a distributed power system is provided, the system including an aggregator communicatively coupled to a plurality of nodes, each of the plurality of nodes including an associated load. The method includes receiving, at the aggregator, a commanded power profile from an independent service operator, the commanded power profile including a commanded power deviation for the distributed power system, calculating, using the aggregator, a score for each of the plurality of nodes based on a current operating power of each node, selecting, using the aggregator, a subset of the plurality of nodes based on the calculated scores, and commanding, using the aggregator, each node in the subset to adjust its current power by a respective predetermined amount, the predetermined amounts determined based on the commanded power deviation.

20 Claims, 14 Drawing Sheets

(51) Int. Cl.

| | |
|---|---|
| *B29C 64/245* | (2017.01) |
| *B29C 64/321* | (2017.01) |
| *B29C 64/393* | (2017.01) |
| *B33Y 10/00* | (2015.01) |
| *B33Y 30/00* | (2015.01) |
| *B33Y 50/02* | (2015.01) |
| *F25D 11/00* | (2006.01) |
| *G05B 13/04* | (2006.01) |
| *G05B 15/02* | (2006.01) |
| *H02J 13/00* | (2006.01) |

(58) Field of Classification Search
USPC .......................................................... 700/293
See application file for complete search history.

(56) References Cited

U.S. PATENT DOCUMENTS

| | | | |
|---|---|---|---|
| 8,674,541 | B2 | 3/2014 | Peitzke et al. |
| 8,818,889 | B2* | 8/2014 | Papavasiliou .......... G06Q 40/04 705/37 |
| 9,008,852 | B2 | 4/2015 | Forbes, Jr. |
| 9,411,329 | B2 | 8/2016 | Greene et al. |
| 9,733,623 | B2 | 8/2017 | Yang et al. |
| 10,461,540 | B2 | 10/2019 | Ghaemi et al. |
| 2007/0276547 | A1* | 11/2007 | Miller ....................... H02J 3/32 705/412 |
| 2011/0231320 | A1 | 9/2011 | Irving |
| 2014/0018969 | A1* | 1/2014 | Forbes, Jr. .............. H02J 13/00 700/295 |
| 2014/0277808 | A1 | 9/2014 | Irisarri et al. |
| 2014/0280899 | A1* | 9/2014 | Brewster, Jr. ....... H04L 43/0817 709/224 |
| 2015/0012146 | A1 | 1/2015 | Cherian et al. |
| 2015/0295405 | A1 | 10/2015 | Black et al. |
| 2016/0056628 | A1* | 2/2016 | Burstall ................. G05B 15/02 700/295 |
| 2016/0347195 | A1 | 12/2016 | Bridges et al. |
| 2019/0173282 | A1* | 6/2019 | Lelusz ..................... G05F 1/66 |

FOREIGN PATENT DOCUMENTS

| | | |
|---|---|---|
| EP | 3376630 A1 | 9/2018 |
| WO | 2016027041 A1 | 2/2016 |
| WO | 2016172348 A1 | 10/2016 |

OTHER PUBLICATIONS

Li et al., "Control of three-phase grid-connected microgrids using artificial neural networks", 2015 7th International Joint Conference on Computational Intelligence (IJCCI), pp. 58-69, Lisbon, 2015.

U.S. Appl. No. 15/462,136, filed Mar. 17, 2017, entitled Scalable Flexibility Control of Distributed Loads in a Power Grid.

Ferrarini, et al., "A Distributed Model Predictive Control approach for the integration of flexible loads, storage and renewables," 2014 IEEE 23rd International Symposium on Industrial Electronics (ISIE), 6 pages.

Babar, et al., "The conception of the aggregator in demand side management for domestic consumers," International Journal of Smart Grid and Clean Energy, vol. 2, No. 3, Oct. 2013, 5 pages.

Halvgaard, et al., "Thermal Storage Power Balancing with Model Predictive Control," 2013 European Control Conference (ECC) Jul. 17-19, 2013, Zurich, Switzerland, 6 pages.

Ghaemi, et al., "Scalable Optimal Flexibility Control of Distributed Loads in Power Grid," Last Accessed: May 2, 2017, 7 pages.

Extended European Search Report, dated Jul. 2, 2018, for related EP patent application No. EP 18151437.3.

Oukarakis E., et al., "Investigation of Maximum Possible OPF Problem Decomposition Degree for Decentralized Energy Markets," IEEE Transactions on Power Systems, IEEE Service Center, Piscataway, NJ, US, vol. 30, No. 5, Sep. 1, 2015, pp. 2566-2578.

Motto, et al., "On Walrasian Equilibrium for Pool-Based Electricity Markets," IEEE Transactions on Power Systems, vol. 17, No. 3, Aug. 1, 2002, pp. 774-781.

Xu, et al., "Operation Strategies of the Load Aggregator with Electric Energy Storage," 2012 IEEE International Conference on Power System Technology (POWERCON), 6 pages.

International Search Report and Written Opinion, dated Nov. 12, 2018, for PCT/US2020/050903 (16 pgs.).

* cited by examiner

SYSTEMS AND METHODS FOR RAPIDLY RESPONDING TO COMMANDED POWER PROFILES

STATEMENT REGARDING FEDERALLY SPONSORED RESEARCH AND DEVELOPMENT

This invention was made with Government support under contract number DE-AR0000698 awarded by ARPA-E. The Government has certain rights in this invention.

CROSS REFERENCE TO RELATED APPLICATIONS

This patent application is a National Stage Entry of PCT/US2018/050903 filed on Sep. 13, 2018, the disclosure of which is hereby incorporated by reference herein in its entirety as part of the present application.

BACKGROUND

The subject matter described herein relates generally to power distribution systems and, more particularly, to load (demand) side power grid control.

The power generation industry is transitioning from being primarily based on a small number of large centralized power plants to a diversified network that combines conventional power plants, renewable power generation (e.g., solar, wind and the like), energy storage and microgrids. Traditionally, power grids have been designed to accommodate variable load demand, in which central-station power plants at a transmission level provide services down to the industrial, commercial, and residential end users at a distribution level.

As renewable energy is becoming a major contributor in meeting demand, grid control systems need to provide more flexibility for power systems to compensate for the volatility of renewable energy. More particularly, due to uncertainties in renewable energy resource availability, renewable power generation cannot be accurately forecast.

To facilitate the penetration of renewable power generation (such as wind turbines and solar panels) into the power grid, load-side control is used. In general, the purpose of load-side control is to attempt to optimize the collective power consumption of the loads (such as buildings), including to accommodate uncertainties in the renewable power generation.

BRIEF DESCRIPTION

In one aspect, a method for controlling a distributed power system is provided, the system including an aggregator communicatively coupled to a plurality of nodes, each of the plurality of nodes including an associated load. The method includes receiving, at the aggregator, a commanded power profile from an independent service operator, the commanded power profile including a commanded power deviation for the distributed power system, calculating, using the aggregator, a score for each of the plurality of nodes based on a current operating power of each node, selecting, using the aggregator, a subset of the plurality of nodes based on the calculated scores, and commanding, using the aggregator, each node in the subset to adjust its current power by a respective predetermined amount, the predetermined amounts determined based on the commanded power deviation.

In another aspect, a distributed power system is provided. The distributed power system includes a plurality of nodes, each node includes an associated load, and an aggregator communicatively coupled to the plurality of nodes. The aggregator is configured to receive a commanded power profile from an independent service operator, the commanded power profile including a commanded power deviation for the distributed power system, calculate a score for each of the plurality of nodes based on a current operating power of each node, select a subset of the plurality of nodes based on the calculated scores, and command each node in the subset to adjust its current power by a respective predetermined amount, the predetermined amounts determined based on the commanded power deviation.

In yet another aspect, an aggregator for controlling a distributed power system is provided. The aggregator is communicatively coupled to a plurality of nodes each including an associated load. The aggregator includes a memory device and a processor communicatively coupled to the memory device. The processor is configured to receive a commanded power profile from an independent service operator, the commanded power profile including a commanded power deviation for the distributed power system, calculate a score for each of the plurality of nodes based on a current operating power of each node, select a subset of the plurality of nodes based on the calculated scores, and command each node in the subset to adjust its current power by a respective predetermined amount, the predetermined amounts determined based on the commanded power deviation.

DRAWINGS

These and other features, aspects, and advantages of the present disclosure will become better understood when the following detailed description is read with reference to the accompanying drawings in which like characters represent like parts throughout the drawings, wherein.

Figure 1:
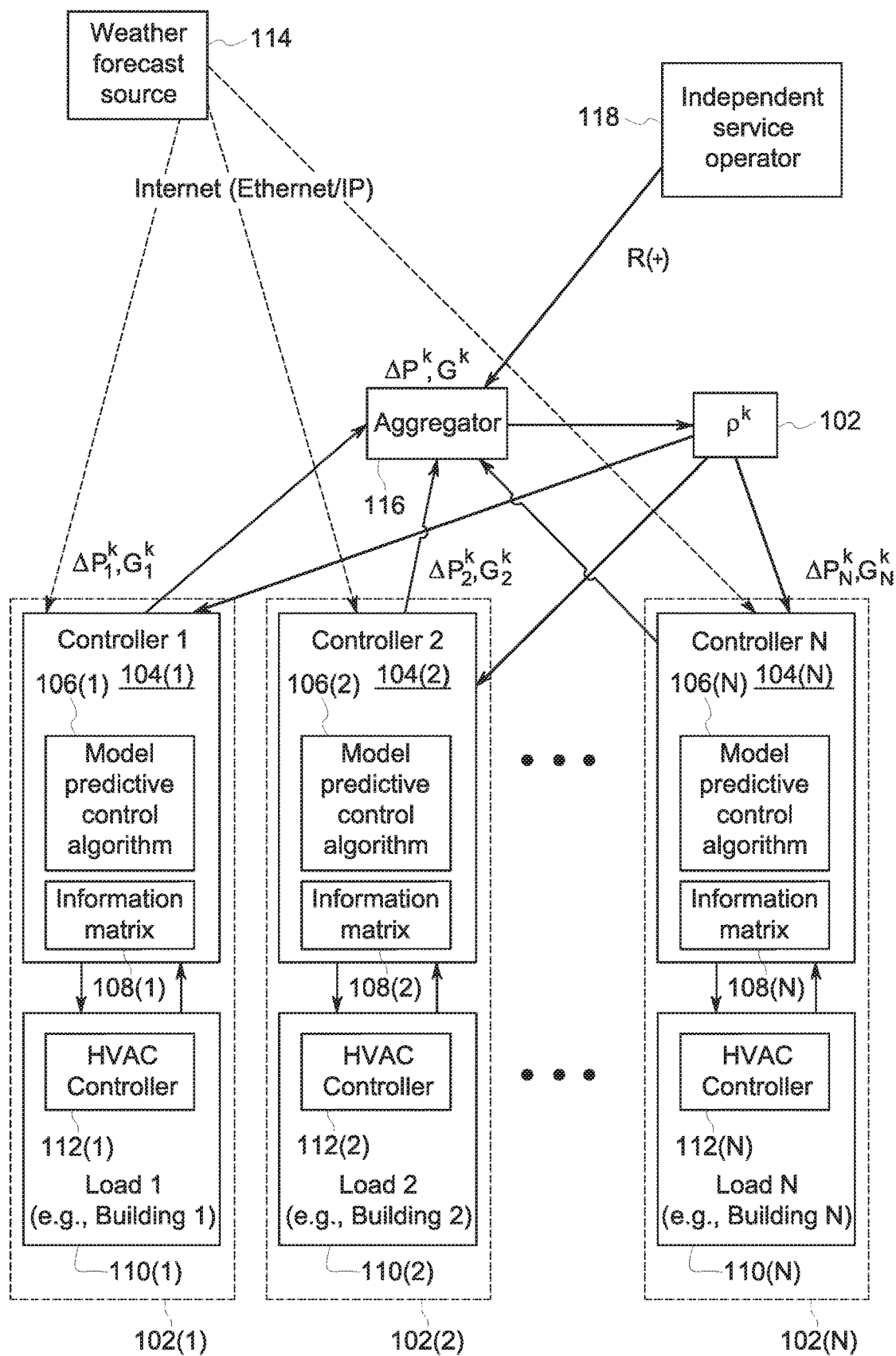
FIG. 1 is a block diagram of an exemplary environment in which an aggregator load structure communicates with nodes corresponding to controlled loads.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The systems and methods described herein provide an aggregator that implements rapid response functionality in a distributed power system. The aggregator receives a commanded power profile from an independent service operator, the commanded power profile including a commanded power deviation for the distributed power system. The aggregator further calculates a score for each of a plurality of nodes based on a current operating power of each node, and selects a subset of the plurality of nodes based on the calculated scores. Further, the aggregator commands each node in the subset to adjust its current power by a respective predetermined amount, the predetermined amounts determined based on the commanded power deviation.

Various aspects of the technology described herein are generally directed towards distributed load-side power control. In the embodiments described herein, the technology includes a distributed optimization approach for control of an aggregation of distributed flexibility resources (DFRs, which may be referred to as nodes), such that a commanded power profile (e.g., specified by an independent service operator) is produced by aggregated loads. In general, and as will be understood, the technology is based on a distributed iterative solution to solve a network utility maximization problem.

In general, each distributed flexibility resource node solves a local optimization problem with its own local constraints (e.g., limits on temperatures on zones within a building) and states. However, the cost function incorporates a global (that is, shared by all nodes) Lagrange multiplier to augment information from the full set of distributed nodes, to track the need for additional power (via a reserve request signal) as an aggregate entity. To this end, the global Lagrange multiplier is calculated at an aggregation level using information that is gathered from each node, with the newly calculated global Lagrange multiplier, associated with the constraint that requests that aggregated power needs to equal the command power generated by an independent service operator, broadcast to each node. The operations are iterative; each node uses the received Lagrange multiplier to perform one iteration of an optimization algorithm that calculates the search direction using the given Lagrange multiplier and sends updated information to an aggregator, which then recalculates a new Lagrange multiplier from the updated information, broadcasts the new Lagrange multiplier to the nodes for a next optimization iteration, and so on, until the aggregator determines that a sufficient level (some defined level) of convergence is reached. This procedure is performed at each sample time and once convergence occurs, loads apply the computed optimal control.

The technology described herein solves the network optimization problem of power tracking of aggregated loads in a distributed fashion. More particularly, solving a large scale optimization problem arising from the optimization of (on the order of) hundreds of thousands or even millions of loads in a centralized way is computationally infeasible, whereby traditional approaches are not able to handle local constraints of the loads and achieve aggregated power tracking performance. The technology described herein provides an iterative, distributed way of computing optimization that makes solving such a large scale optimization problem tractable.

It should be understood that any of the examples herein are non-limiting. As such, the technology described herein is not limited to any particular implementations, embodiments, aspects, concepts, structures, functionalities or examples described herein. Rather, any of the implementations, embodiments, aspects, concepts, structures, functionalities or examples described herein are non-limiting, and the technology may be used in various ways that provide benefits and advantages in power control concepts in general.

In general and as represented in FIG. 1, a number of (distributed flexibility resource) nodes 102(1)-102(N) are managed as described herein with respect to power control. There may be any practical number of nodes, possibly on the order of millions.

Represented nodes 102(1)-102(N), include controllers 104(1)-104(N) having model predictive control algorithms 106(1)-106(N) and information matrixes 108(1)-108(N) that describe the local states and constraints of the node. One example state is a local weather forecast obtained from a source 114 such as the National Oceanic and Atmospheric Administration (NOAA), as the weather influences renewable power source output as well as corresponds to how much power a node is likely to need for heating or cooling, for example. Other state that may be maintained may be room temperatures, zone temperatures, heating and cooling characteristics, time of day, day of week and so on.

Nodes 102(1)-102(N) are also shown in FIG. 1 as including loads 110(1)-110(N), which are controllable by heating, ventilation and air conditioning (HVAC) controllers 112(1)-112(N), respectively. A typical example of a load is a building, however it is understood that a building or the like may correspond to multiple, separate loads (e.g., separate nodes), and/or multiple buildings or the like may correspond to a single load (node).

Nodes 102(1)-102(N) are coupled via their respective controllers 104(1)-104(N) to an aggregator 116. As will be appreciated by those of skill in the art, aggregator 116 may be implemented as a computing device that includes a processor communicatively coupled to a memory device. In general and as described herein, aggregator 116 receives a commanded power profile from an independent service operator (ISO) 118, and uses that information along with local load-specific information received from each controller 104(1)-104(N) to compute a global Lagrange multiplier 120 mathematically represented by $\rho^k$ (at iteration k). Global Lagrange multiplier 120 computed by aggregator 116 is sent to controllers 104(1)-104(N), for use by each controller in solving its local optimization problem.

To summarize thus far, the technology is directed towards attempting to more optimally control distributed flexibility resource nodes, such that the aggregated power tracks a commanded power profile that comes from ISO 118. The optimization problem is solved in a distributed way, where each distributed flexibility resource node exchanges data with the aggregator and performs one optimization iteration according to the distributed optimization scheme described herein to solve the global model predictive control optimization problem in a tractable fashion.

In the exemplary embodiment, the modified local cost function is the sum of a local cost (local utility function) and a Lagrange multiplier times the power consumed (supplied) by the distributed flexibility resource. The value of Lagrange multiplier 120 that is shared among nodes 102(1)-102(N) is calculated at the aggregator level. At aggregator 116, the Lagrange multiplier is a function of the commanded power profile and the local data that are sent to aggregator 116 at each iteration of optimization. The recalculated Lagrange multiplier is sent back to the nodes to be used in the cost for next iteration, and so on. As the nodes iterate synchronously, they converge towards an acceptable solution (that is, to a defined/predetermined convergence threshold) to the network/global Model Predictive Control optimization problem through the aforementioned iterative distributed computation scheme.

Figure 2:
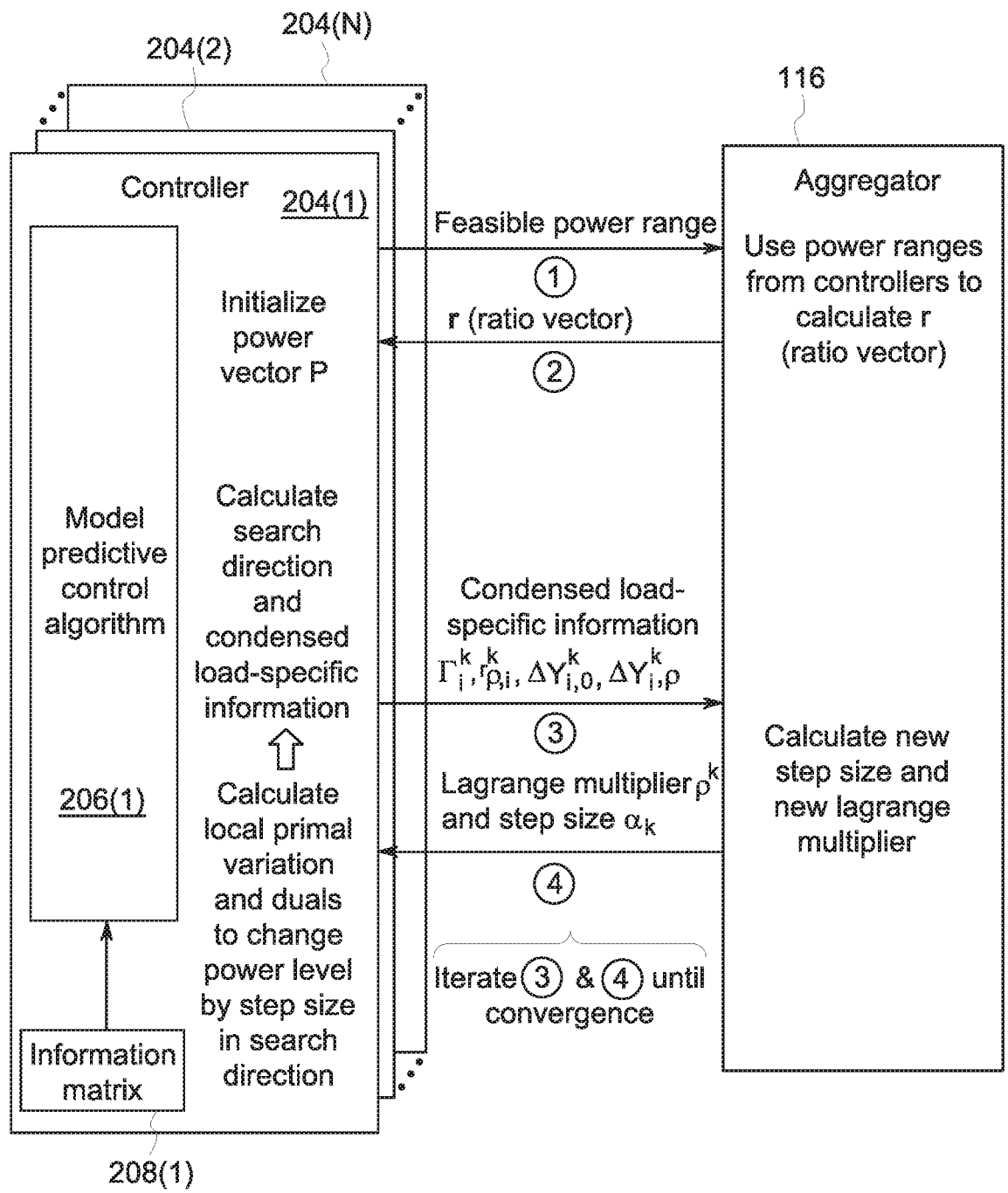
FIG. 2 is an exemplary block/data flow diagram representing a controller communicating information with an aggregator to iteratively converge towards an optimal solution.

As represented in FIG. 2 for an exemplary controller instance 204(1) (of a set of controller instances 204(1)-204(N)), the iterative distributed scheme can be described in the following operations, also exemplified in the flow diagram of FIG. 3. At a time to adjust (represented by operation 302 of FIG. 3), such as once per minute, each of the controllers are initialized (represented by labeled arrows one (1) and two (2) in FIG. 2, and also by operation 304 of FIG. 3). In general, and as further described herein, controller 204(1) sends its feasible power range to aggregator 116, which then uses the feasible power ranges of the various controller instances 204(1)-204(N) to compute a ratio (e.g., a vector r) for each controller. This ratio is used to compute an initial power vector at each load (operation 304 of FIG. 3).

Figure 3:
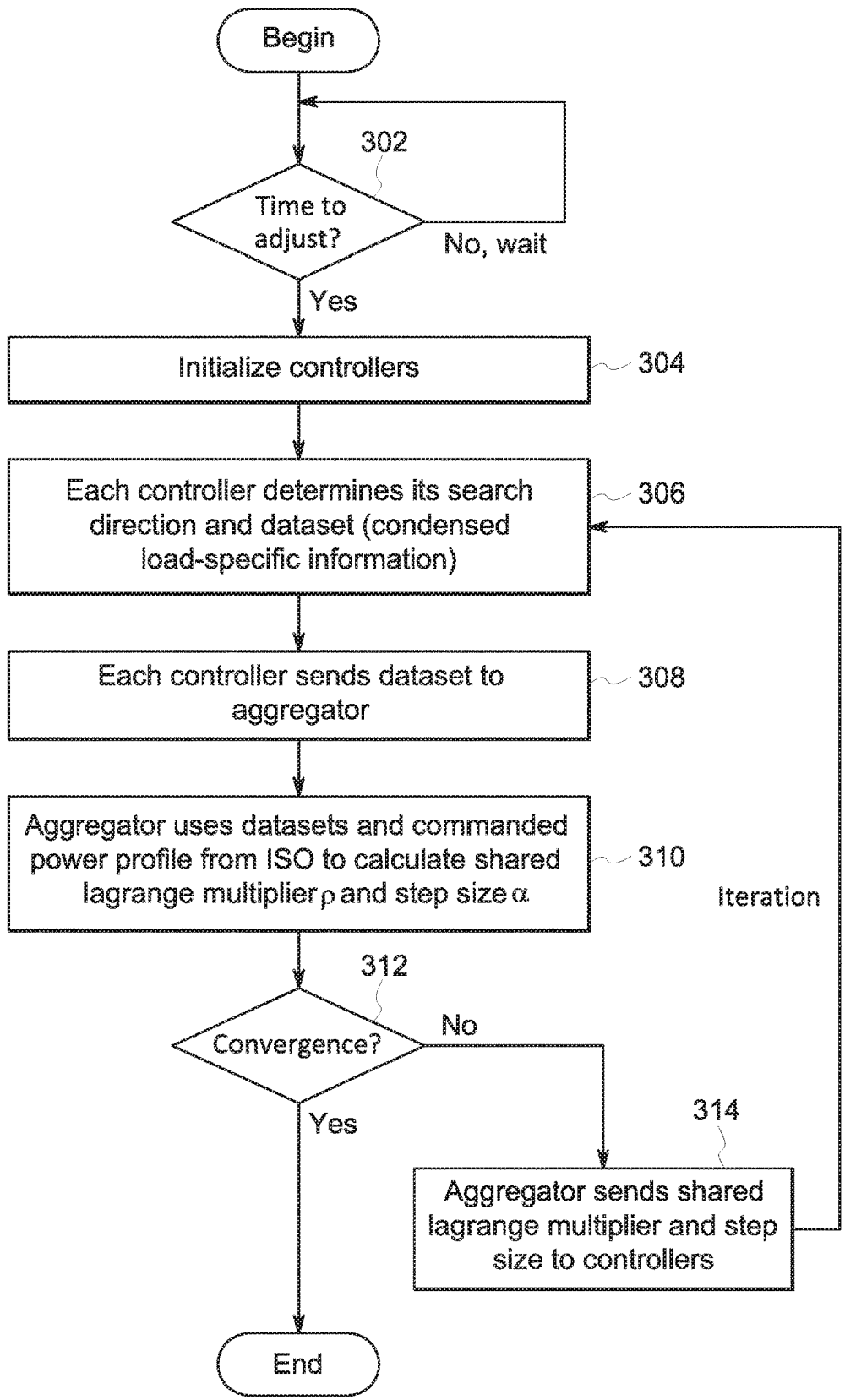
FIG. 3 is a flow diagram showing exemplary operations of an iterative, distributed power control technology.

Once initialized, the communications represented by labeled arrows three (3) and four (4) in FIG. 2, and operations 306, 308, 310, 312 and 314 of FIG. 3 are performed iteratively. At operation 306, each controller solves the local nonlinear programming problem for the search direction as described below. As a side product, a set of data comprising load-specific information (a dataset in condensed form) is also generated and sent to aggregator 116 (arrow three (3) in FIG. 2, operation 308 in FIG. 3).

At the aggregator, at operation 310, using the data collected from the nodes and the commanded power profile from the independent service operator, the shared Lagrange multiplier is calculated, along with a step size. If convergence to the desired, defined level is not yet achieved (operation 312), the Lagrange multiplier and step size are sent to the nodes (arrow four (3) in FIG. 2 and operation 314 in FIG. 3).

Using the new value of the Lagrange multiplier, a new search direction and an updated dataset is calculated by iteratively returning to step 306. The updated dataset is sent from controller 204(1) to aggregator 116 (arrow three (3) in FIG. 2 and operation 308 in FIG. 3. The aggregator computation at operation 310 and the broadcast to the nodes at operation 314 is repeated and so on, until the convergence is detected at operation 312.

Turning to additional details, in the exemplary embodiment, the distributed optimal control technology uses an algorithm based on a distributed computation of the Newton iteration, which provides faster convergence relative to other methods (such as alternating direction method of multipliers or sub-gradient methods). As will be understood, the distributed optimal control technology exploits a structure of the problem to calculate an exact Newton step as opposed to inexact versions that require iterations to calculate the Newton direction. The technology described herein coordinates loads and distributed energy resources, and exploits their flexibilities such that the aggregated power follows the profile commanded by the ancillary services, where ancillary services are basically those functionalities provided by the power grid that support a continuous flow of power and work to guarantee that supply will meet demand.

For each load, an optimization problem is defined essentially as a local model predictive control formulation. The cost represents local objectives, and constraints are determined by dynamics and other operational and quality of service (QoS) constraint or constraints on states and inputs of the systems; e.g., temperate comfort interval may be a QoS constraint. The power tracking constraint is generally the only system-level constraint that couples the local sub-system-level optimization problems. Hence, it leads to a global optimization problem whose solution meets local objectives and constraints, and at the same time provides total power that follows the power profile demanded by the ancillary services.

Defined herein is a global optimization problem, along with an algorithm that is scalable and can efficiently solve the problem in a distributed manner. The solution calculates Newton steps (e.g., exact Newton steps) and step size in a distributed fashion in the sense that at the load, load-level information related to the step size is calculated and sent to the aggregator, and at the aggregator level, the step size is calculated using that information, so that while the solution enjoys fast convergence of Newton primal iterations, it is also scalable to a large number of loads.

Consider a network of loads and differential algebraic equations as represented by a set $\mathcal{L} = \{L_1, \ldots, L_N\}$. For each load there are states and inputs that define the dynamics of the load that are usually defined by a set of differential algebraic equations. Differential algebraic equations are converted to discrete time equations to construct equality constraints for numerical optimization. Constraints on inputs or state form another set of equality and inequality constraints. The local optimization problem that formulates model predictive control for the load $L_i \in \mathcal{L}$ is characterized as:

$$\min_{X_i} f_i(X_i) \tag{1}$$

$$\text{s.t.} \quad g_i(x_i) \leq 0$$

$$h_i(X_i) = 0$$

$$P_i = m_i(X_i)$$

where $X_i$ is the vector containing states, inputs and algebraic variables over the prediction horizon, $f_i$ is the local cost function of the optimization problem, $h_i$ and $g_i$ are the functions characterizing equality constraint containing discrete-time dynamics and other constraints imposed due to physics or stability of the load. $P_i$ is the vector representing the power dispatched over the prediction horizon and $m_i$ is the map from $X_i$ to $P_i$. The power tracking constraint $$P_d = \sum_{i=1}^{N} P_i \tag{2}$$

is imposed to make the aggregated power follow the target power $P_d$, where $P_d$ is the vector containing the desired power profile over the prediction horizon. Local optimization problems subject to the global constraint construct the following optimization problem:

$$\min_{\{X_i, i=1,\ldots,N\}} \sum_i f_i(X_i) \tag{3a}$$

$$\text{such that} \quad g_i(x_i) \leq 0 \tag{3b}$$

$$h_i(X_i) = 0 \tag{3c}$$

$$P_i = m_i(X_i) \tag{3d}$$

$$P_d = \sum_{i=1}^{N} P_i \tag{3e}$$

The optimization problem defines a global model predictive control framework where the problem is solved iteratively to determine an optimal control sequence for each load such that the control sequence optimizes the local objective subject to local dynamics and constraints, while the aggregated dispatched power by the loads track the desired power profile determined by any ancillary services. The first element of the optimal control sequence for each load is implemented at each sample time.

As described herein, an assumption is that the functions $g_i$, $h_i$ and $m_i$ are linear and the functions $f_i$ are self-concordant. The problem may be reformulated to one with only an equality constraint by introducing a non-negative slack vector $S_i \geq 0$ such that $g_i(X_i)+S_i=0$, and logarithmic barrier functions of slack variables. Then define $Y_i:=[X_i^T, S_i^T]^T$, $E(Y_i):=[(g_i(X_i)+S_i)^T]$, $(h_i(X_i))^T$, $m_i(Y_i):=m_i(X_i)$ and $F_i(Y_i,$ $\mu):=f_i(X_i)+\mu(br(S_i))$ where the barrier function of the vector $S_i$, $br(S_i)$, is defined as $br(S_i)=\sum_{j=1}^{|S_i|} -\log S_j^i$, wherein $S_i=S_i^1, \ldots, S_i^{|S_i|}$, $|S_i|$ is the dimension of the vector $S_i$, and $\mu \leq 1$ is the positive coefficient of the barrier function. Because $E_i$ and $M_i$ are affine functions they can be written as $E_i(Y_i)=A_i Y_i - b_i$ and $M_i(Y_i)=C_i Y_i - d_i$. Hence, the problem is in the following form:

$$\min_{\{Y_i, i=1,\ldots,N\}} \sum_i f_i(Y_i) \tag{4a}$$

$$\text{s.t.} \quad A_i(Y_i) = b_i \tag{4b}$$

$$P_i = C_i Y_i - d_i \tag{4c}$$

$$P_d = \sum_{i=1}^{N} P_i \tag{4d}$$

An assumption is that the matrix $[A_i^T, C_i^T]^T$ is full row rank; it is straightforward to prove that this holds for large class of systems, if in the subsystem $L_i$, the power is an input of the system and (eq. 3c) represents the linear dynamic of the system.

Moreover, let $J(Y):=\sum_i F_i(Y_i)$ where $J$ denotes the objective function and $Y$ is the concatenation of $Y_i$, $i=1, \ldots, N$. The matrices and vectors $A$, $b$, $C$ and $d$ are defined with appropriate dimensions such that $AY-b$ and $P_d=CY+d$ represent the equality constraints.

Therefore, the optimization problem may be written as $$\min_Y J(Y) \tag{5a}$$

$$\text{such that } AY = b \tag{5b}$$

$$P_d = CY + d \tag{5c}$$

Described herein is a distributed optimization scheme to solve the above optimization problem. The scheme is based on the equality constrained Newton method, where the Newton direction and step size are calculated in a distributed fashion using data communication between an aggregator and the loads.

Define $\{Y^k\}$ as the sequence of primal vectors and $\{\lambda^k\}$ the sequence of dual variables associated with constraints (eq. 5b), and $\{\rho^k\}$ the sequence of dual variables associated with the power balance constraint (eq. 5c), generated by Newton iterations. The algorithm updates the sequence of primal vectors by $$Y^{k+1} = Y^k + \alpha_k \Delta Y^k \tag{6}$$

where $0 \leq \alpha_k \leq 1$ and $\Delta Y^k$ is the Newton search direction given by $$H^k \Delta Y^k + A^T \lambda + C^T \rho = -\nabla_Y J(Y^k)$$

$$A \Delta Y = 0$$

$$C \Delta Y = 0 \tag{7}$$

where $H^k := \nabla^2 j(Y^k)$. It is desired to solve (eq. 7) in a distributed fashion that is scalable such that it can be deployed for very large number of loads. To this end, described herein is exploiting the special sparsity of the problem to explicitly calculate the search direction. The following theorem enables the development of a distributed iterative algorithm to calculate the Newton search direction.

Assume the optimization problem set forth above is strictly feasible. Given primal vectors $Y_i$, i=1, ..., N, the Lagrange multiplier associated with the power tracking constraint is set forth in (7) is given by $$\rho^k = -\Gamma^{k-1} r_\rho^k \qquad (8)$$

where $$\Gamma^k := \sum_{i=1}^{N} [C_i \ 0](K_i^k)^{-1} \begin{bmatrix} C_i^T \\ 0 \end{bmatrix}, \qquad (9)$$

$$r_\rho^k := \sum_{i=1}^{N} [C_i \ 0](K_i^k)^{-1} \begin{bmatrix} \nabla_{Y_i} F_i(Y_i) \\ 0 \end{bmatrix}, \qquad (10)$$

and $$K_i^k := \begin{bmatrix} H_i^k & A_i^T \\ A_i & 0 \end{bmatrix}$$

is the local KKT (Karush-Kuhn-Tucker) matrix. Moreover, $\Delta Y_i^k$ and $\lambda_i^k$ are calculated as $$\begin{bmatrix} \Delta Y_i^k \\ \lambda_i^k \end{bmatrix} = -(K_i^k)^{-1} \begin{bmatrix} C_i^T \\ 0 \end{bmatrix} \rho^k - (K_i^k)^{-1} \begin{bmatrix} \nabla_{Y_i} F_i(Y_i) \\ 0 \end{bmatrix}, \qquad (11)$$

where the matrix and vector 0 are with appropriate dimensions.

As proof, (7) may be written in the following form:

$$H_i^k \Delta Y_i^k + A_i^T \lambda_i^k + C_i^T \rho_i^k = -\nabla_{Y_i} F_i(Y_i) \qquad (12a)$$

$$A_i \Delta Y_i = 0 \qquad (12b)$$

$$\sum_{i=1}^{n} C_i \Delta Y_i = 0, i = 1, \ldots, N. \qquad (12c)$$

From (eq. 12a), (eq. 12b), and the definition of the local KKT matrix $K_i^k$, (eq. 11) results.

From (eq. 12c) and (eq. 11), $\Gamma^k \rho^k + r_\rho^k = 0$. According to the above assumption that the matrix $[A_i^T, C_i^T]^T$ is full row rank, the matrix $[A^T, C^T]^T$ is full row rank. Moreover, since $H^k$ is strictly positive definite, and the functions $g_i$, $h_i$ and $m_i$ are linear and the functions $f_i$ are self-concordant, (eq. 7) has a unique solution. Hence, $\Gamma^k$ has to be invertible, otherwise no or infinite values for $\rho^k$ exist that satisfy (eq. 7) along with their corresponding vectors $\Delta Y^k$ and $\lambda^k$. Therefore (eq. 8) holds.

To be able to implement primal vector update (eq. 6), the value of $\alpha_k$ needs to be calculated. The step size is determined by the Newton decrement (ND), defined as $$ND(Y^k) := \sqrt{\Delta Y_k^T H_k \Delta Y_k}. \qquad (13)$$

ND can be written in terms of local information $Y_i^k$ as $$ND(Y^k) = \sqrt{\sum_i \Delta Y_i^{k T} H_i^k \Delta Y_i^k} \qquad (14)$$

The step size $\alpha_k$ then is calculated as a function of ND as follows:

$$\alpha_k = \begin{cases} \dfrac{1}{ND(Y^k)+1} & \text{if } ND(Y^k) \geq 1 \\ 1 & \text{otherwise} \end{cases} \qquad (15)$$

Because the cost function J(Y) is self-concordant and the constraints are linear, the step size calculated according to (eq. 15) provides linear and then quadratic convergence to the optimal solution in two stages. Described herein is having the Newton direction $Y^k$ and step size $\alpha_k$ calculated in a distributed fashion at the aggregator using the data gathered by communication between the aggregator and loads.

FIGS. 1 and 2 describe the communication structure of aggregator 116 and nodes through which the Newton direction and step size are calculated. In the exemplary embodiment, as described in FIG. 3, the operations occur in two general stages. A first stage is feasible initialization, described herein with reference to the flow diagrams of FIG. 4 (the aggregator initialization-related operations) and FIG. 6 (the controller initialization-related operations), where each load is initialized by the power that is locally feasible and satisfies the power balance constraint (eq. 5c). A second stage is optimization iterations, described herein with reference to the flow diagrams of FIG. 5 (the aggregator optimization-related operations) and FIG. 7 (the controller optimization-related operations).

Figure 4:
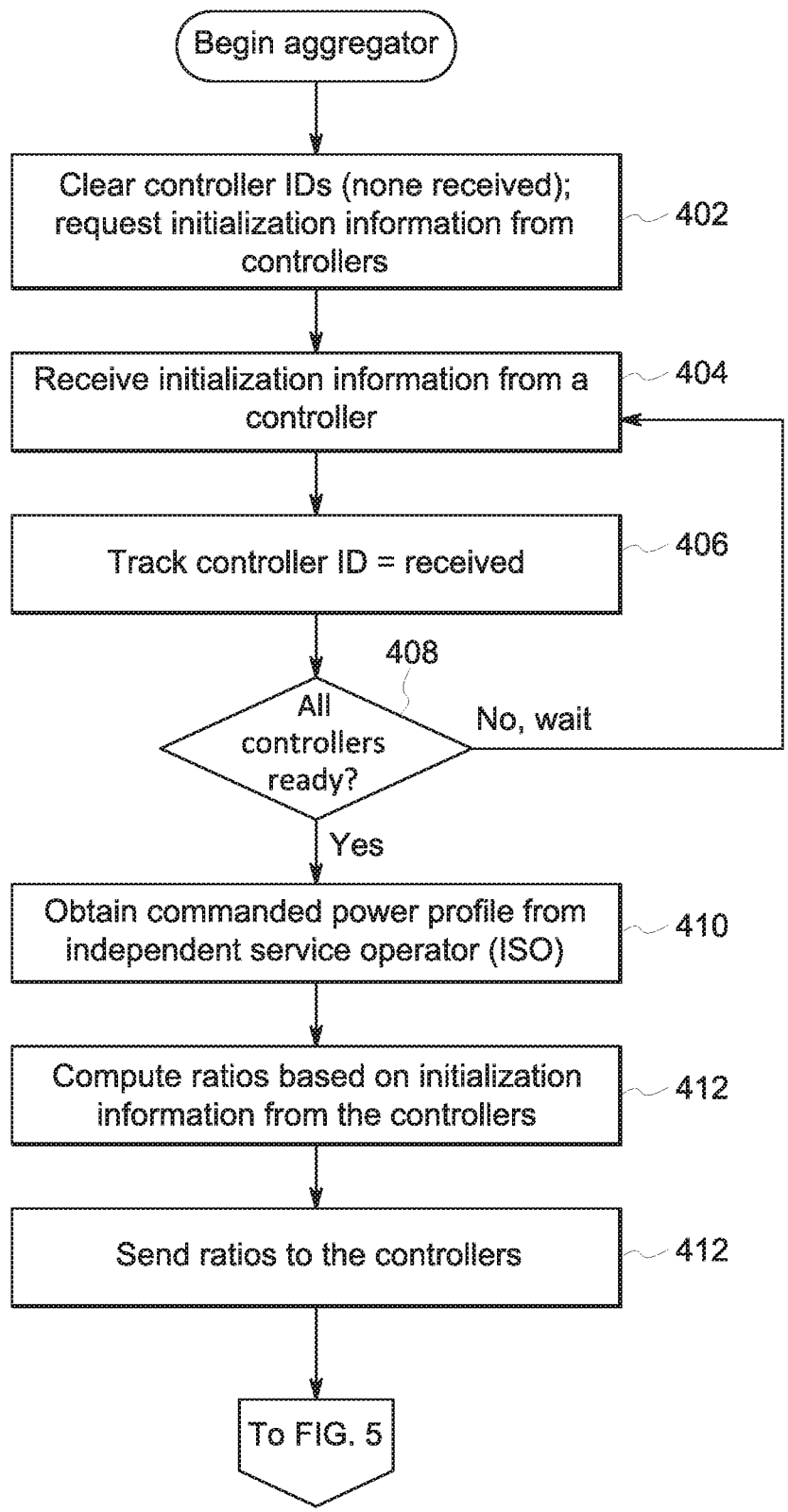
FIGS. 4 and 5 are a flow diagram showing exemplary operations of an aggregator.
Figure 6:
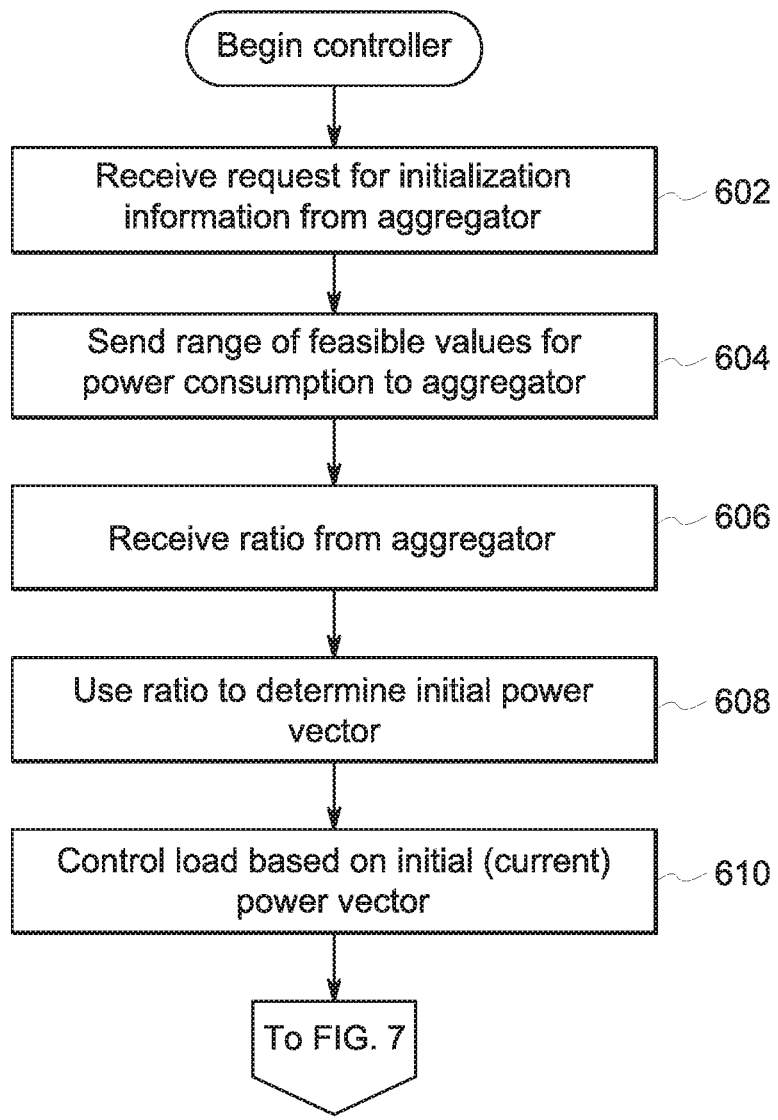
FIGS. 6 and 7 are a flow diagram showing exemplary operations of a per-load distributed controller.

The initialization phase may, in one or more implementations, be started by aggregator 116 initializing itself and requesting that each controller 204 provide power feasible information (operation 402 of FIG. 4 and operation 602 of FIG. 6).

For each load $L_i \in \mathcal{L}$, a range (interval) $[p_{min}^i, p_{max}^i]$ is assumed which defines the feasible values for power consumption. Hence, each of loads 110 sends its respective upper and lower limit of the power feasible range to aggregator 116 (operation 604 of FIG. 6).

Operations 404, 406 and 408 of FIG. 4 represent collecting the initial range information from each of controllers 204. When the range information is received at aggregator 116 from controllers 204, $P_{min} = \Sigma_i p_{min}^i$ and $P_{max} = \Sigma_i p_{max}^i$ are calculated; (note that it is feasible to begin summing before each of controllers 204 has responded). Further note that if the desired values of some elements of $P_d$ do not belong to $[P_{min}, P_{max}]$ then the constraint (eq. 5c) is not feasible. Otherwise, assuming $p_d^j$ is the j-th element of $P_d$, the ratio vector r is calculated as $$r_j := \frac{p_d^j - P_{min}}{P_{max} - P_{min}}$$

where $r_j$ is the j-th element of r. The value of r is then sent to controllers 204, which may differ per controller. Note that the value of r corresponds to the target power obtained from the independent service operator, (operation 410), which may be obtained independently at any suitable time before the ratios are computed and sent (operations 412 and 414).

When the ratio vector is received by a controller (operation 606 of FIG. 6), at each load $L_i$, the power vector $P_i$ is initialized by setting its j-th element of it as $P_i^j = p_{min}^i + r_j (p_{max}^i - p_{min}^i)$ (operation 608 of FIG. 6). The controlling of the load based upon this initial power vector (which is the current power vector at this time) is represented by operation 610 of FIG. 6).

It can be easily shown that the sequence $\{P_i\}$ provides feasible power vectors for the loads $L_i \in \mathcal{L}$ and it satisfies the constraint 5c.

Figure 5:
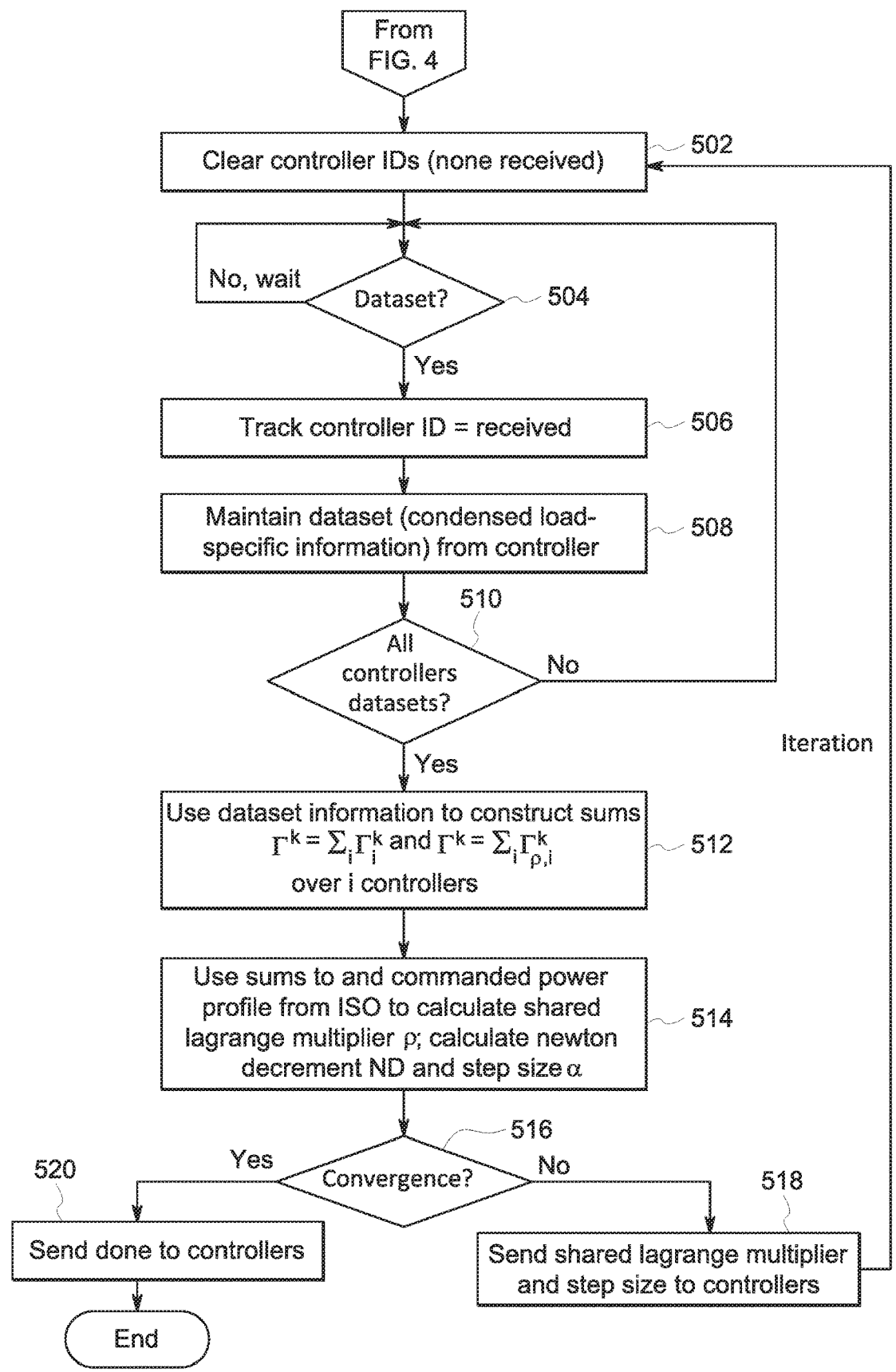
Figure 7:
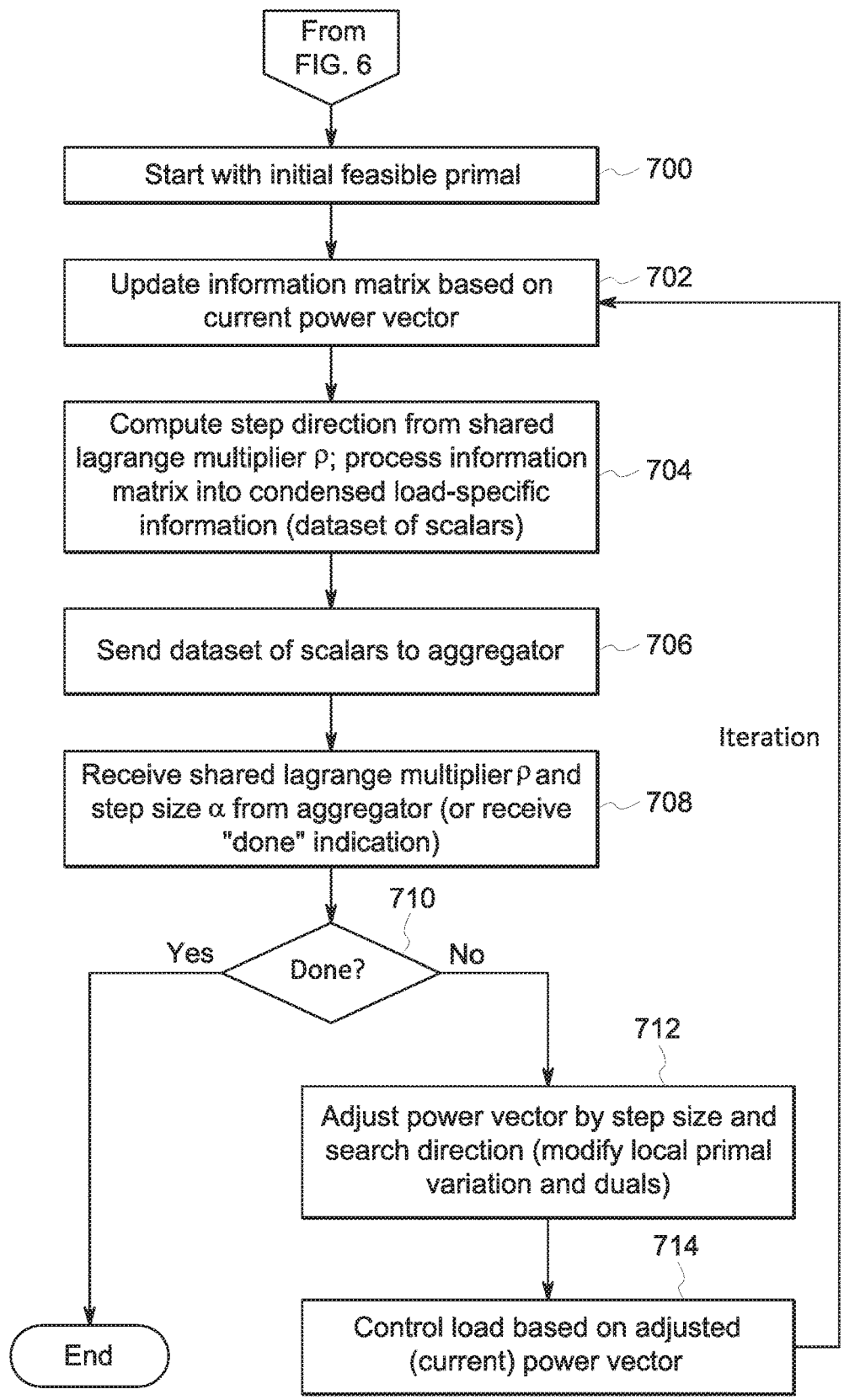

The optimization phase is described herein with reference to the flow diagrams of FIG. 5 (the aggregator optimization-related operations) and FIG. 7 (the controller optimization-related operations). For example, aggregator 116 clears its tracking information (that assures each controller 204 reports its data) and waits for controllers 204 to begin sending their datasets until each is received, as represented by operations 502, 504, 506 and 508 of FIG. 5.

Each controller 204 starts with its own initial feasible primal $Y^0$ (e.g., operation 700 of FIG. 7, not part of the iterations). Note that operation 702 represents updating the information matrix for that node, which may occur independent of any controller operations, e.g., as the power vector changes.

At each load $L_i$, operation 704 is performed, which calculates the step direction and also generates the quantities that represent the information matrix in condensed form, e.g., $\Gamma_i^k$, $r_{\rho,i}^k$, $\alpha_i^k := \Delta Y_{i,\rho}^{k^T} H_i^k \Delta Y_{i,\rho}^k$, $b_i^k := \Delta Y_{i,\rho}^{k^T} H_i^k \Delta Y_{i,0}^k$ and $c_i^k := \Delta Y_{i,0}^{k^T} H_i^k \Delta Y_{i,0}^k$ where $$\Gamma_i^k := [\, C_i \quad 0\,](K_i^k)^{-1} \begin{bmatrix} C_i^T \\ 0 \end{bmatrix} \text{ (a surrogate for sensitivity} \tag{16}$$

of power with respect to in Lagrange multiplier $\rho$);

$$r_{\rho,i}^k := [\, C_i \quad 0\,](K_i^k)^{-1} \begin{bmatrix} \nabla_{Y_i} F_i(Y_i) \\ 0 \end{bmatrix} \text{ (representing the}$$

optimal change of power once $\rho = 0$);

$$\Delta Y_{i,0}^k := [\, I \quad 0\,](K_i^k)^{-1} \begin{bmatrix} C_i^T \\ 0 \end{bmatrix}; \text{ (representing the}$$

sensitivity of the local search direction with respect to $\rho$);

$$\Delta Y_{i,\rho}^k := [\, I \quad 0\,](K_i^k)^{-1} \begin{bmatrix} \nabla_{Y_i} F_i(Y_i) \\ 0 \end{bmatrix}$$

(representing the local search direction once $\rho = 0$.

These per-node dependent values are sent to aggregator 116 by each controller 204 at operation 706 of FIG. 7.

Aggregator 116, as represented by operation 512 of FIG. 5, constructs $\Gamma^k = \Sigma_i \Gamma_i^k$ and $r_\rho^k = \Sigma_i r_{\rho,i}^k$, note that the summations may begin before each controller 204 has reported its dataset. Aggregator 116, as represented by operation 514 of FIG. 5, calculates $\rho^k$ using (eq. 8), calculates the Newton decrement, $ND(Y^k) = \sqrt{\Sigma_i(\alpha_i^k \rho^{k^2} + 2b_i^k \rho^k + c_i^k)}$, and calculates $\alpha_k$ according to (15). If the value of $ND(Y^k)$ is sufficiently small, as based upon a predefined convergence level, operation 516 terminates the iterations. Otherwise, operation 518 sends $\rho^k$ and $\alpha_k$ to controllers 204.

At each controller 204, if $\rho^k$ and $\alpha_k$ are received (operations 708 and 710 of FIG. 7), $\rho^k$ and $\alpha_k$ are used to calculate the local primal variation and duals according to (eq. 11) and update the primal according to (eq. 6); (operation 712 of FIG. 7. This changes the power control of the load (step 714). Note that operation 710 represents receiving a "done" indication from the aggregator, which is not strictly necessary if operation 708 does not receive anything further, until operation 602 restarts the next controller initialization.

Turning to another aspect, some loads have discrete power consumption, that is, are either on or off (in contrast to loads that accept continuous values for power control). Described herein is an algorithm that can handle loads that only accept boundary values of the power feasible interval (assuming the interval is the range from minimum to maximum). Thus, the power only accepts discrete values, e.g., $p_i \in \{p_{min}^i, p_{max}^i\}$ for the loads $L_i \in \mathcal{L}_d \subset \mathcal{L}$. A general goal here is to avoid mixed-integer programming, which is often not suitable for real time optimization, especially for large scale problems.

To this end, the optimization problem is first solved according to the algorithm assuming all the loads accept continuous values for power within the feasible interval. Let $\{\overline{P}_i\}$ be the sequence of optimal power vectors and $$P_{dsc} := \Sigma_{L_i \in \mathcal{L}_d} \overline{P}_i \text{ be the power consumed by loads with}$$

discrete power consumption. Further, let $N_{dsc} = |\mathcal{L}_d|$ be number of the loads with discrete power input. The following algorithm turns the value of elements of $\overline{P}_i$ to $p_{max}^i$ of $p_{min}^i$ so that the desired power $P_d$ is tracked as close as possible while the power values closer to maximum have higher priority to be switched to $p_{max}^i$.

Via operations 802, 806 and 808, for each element j, which represents the j-th step in the prediction horizon, operation 804 sorts the sequence $$\left\{ \frac{p_{max}^i - \overline{P}_i^j}{p_{max}^i - p_{min}^i} \right\}$$

and denotes it by $\{\hat{P}_i^j\}$. Also, operation 804 denotes the corresponding sequence of the load numbers by I.

Operation 810 finds the maximum value of $n_j$ such that $\Sigma_{i=1}^{n_j} P_{max}^{I_i} \leq P_d^j$. Operation 812 sets $P_{I_k}^j = p_{max}^{I_k}$, for $k = 1, \ldots, n_j$ and sets the rest to $p_{max}^{I_k}$.

Combining the continuous load optimization with the above-described discrete load post-processing allows the technology to handle any mixture of continuous and discrete loads. The effectiveness of the proposed distributed optimal control scheme may be shown via a numerical simulation, e.g., considering 100 buildings as the distributed loads. Each building is individually controlled by its own HAVC control system. Each building may have single or multiple Roof Top Units (RTUs) managed by a single controller, or multiple controllers through a Building Management System (BMS). Each building communicates with the aggregator, e.g., via a controller as described herein. As described herein, a main purpose of the distributed optimal controller is to compute power set points to each building such that the sum of powers consumed by the buildings tracks the power set point commanded by the grid independent service operator (ISO), while keeping each building temperature within the defined comfort zone to the extent possible. The thermal dynamics of the i-th building may be modeled using an equivalent RC circuit, as:

$$C_i \frac{d\tau_i}{dt} = -\frac{\tau_i - \tau_i^0}{R_i} - P_i, \tag{17}$$

where $P_i$ is the input power, $\tau_i^0$ is the ambient temperature [80° F.], $R_i$ is the thermal resistance [2.5° C./kW], $C_i$ is the thermal capacitance [1.5 kW h/° C.] and $P_{max_i}$ is the maximum power consumption [7.2 kW].

The above parameters represent a nominal load model. The load parameters may be stochastically perturbed to account for model uncertainties in different buildings. At the abstraction level from the aggregator's perspective, this RC model captures the building dynamics well, while keeping the computations tractable for a larger number of loads. It can be reasonably assumed that the dynamics of heating, ventilation and air conditioning (HVAC) controller 112 are much faster than the thermal dynamics of the building, and can be neglected in this context. Further, assume the loads are of the same dynamic time scale and that the communication delays between loads and aggregator 116 are negligible. While older buildings have ON-OFF HVAC controllers, thus making them discrete loads, most newer buildings are equipped with either variable air volume (VAV) handling, or electronic expansion valves in the HVAC refrigeration cycle, making them a continuously controllable load. For continuous loads, the power set point at each instant can be any number between 0 and $P_{max}$. For discrete loads, the power at each instant is either 0 (OFF mode) or $P_{max}$ (ON mode), and there is also a hysteresis mechanism, such as with the minimum on and off times as follows:

MIN-OFF-TIME=4 mins

MIN-ON-TIME=6 mins, which means that once the HVAC is OFF, it remains OFF for at least 4 minutes, and once it is turned ON, it remains ON for at least 6 minutes. In order to accommodate both newer and older buildings, in these example simulations, fifty loads are randomly selected as continuous and the remaining fifty loads as discrete. The loads are simulated with random and different initial temperatures. The thermal comfort zone is defined to be between 75° F. and 79° F. and is penalized using a log barrier in the optimization overall cost function. A load is referred to as "active" if the load is available for control. Continuous loads are virtually always available, while discrete loads are only available if their status is changeable, i.e. they are not within their time hysteresis region.

At each time step, an interior point optimization problem is solved in a distributed fashion as described herein. In each iteration of the optimization, the aggregator waits until it receives information from all loads, computes p and broadcasts back to all loads. The potential time differences between each load to complete one iteration of the optimization is negligible compared to the time scale of the load dynamics. Thus, during the potential wait time of the aggregator, the load temperatures remain almost constant. To put this into context, one iteration of the optimization problem may take a fraction of a second, while the thermal time constant of a building is typically several minutes up to a few hours.

Figure 9:
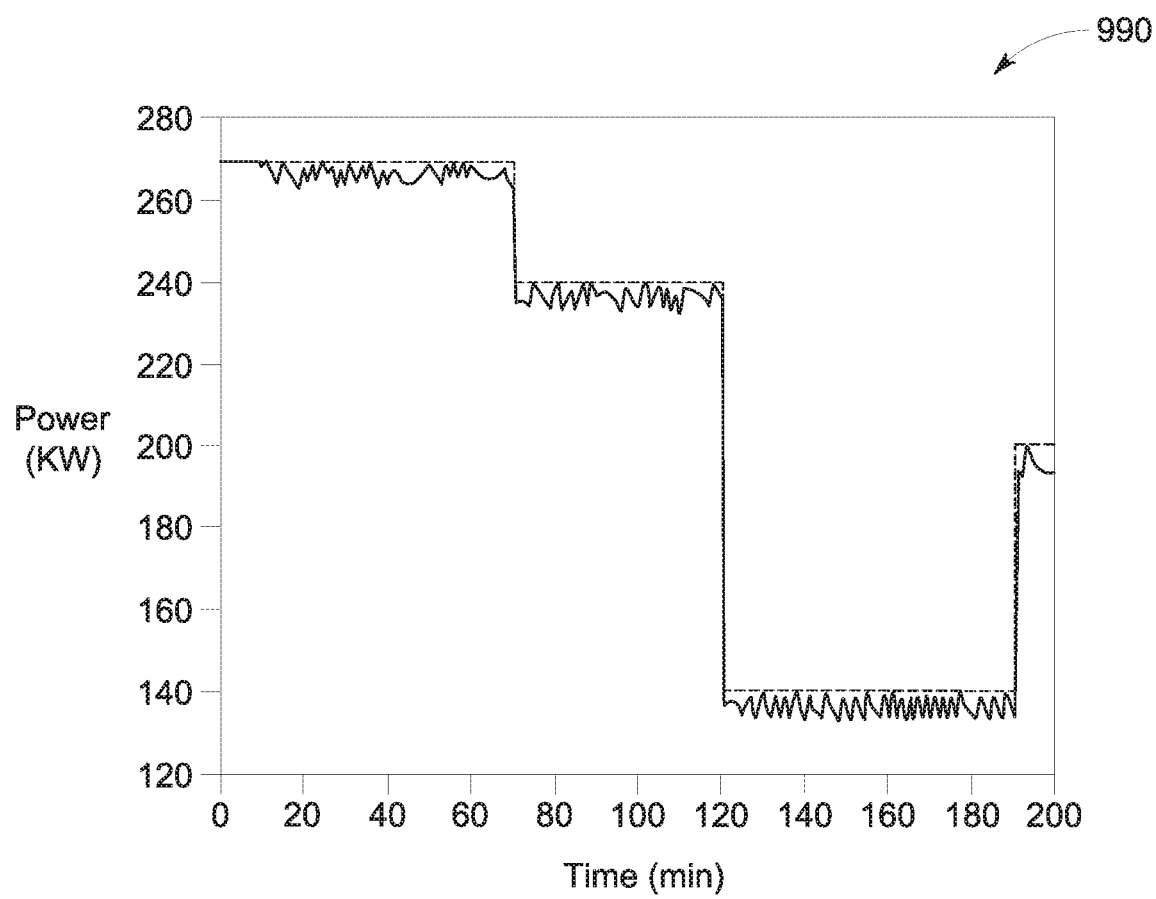
FIG. 9 is a graphical representation of a simulation demonstrating achieved power versus commanded power over time.

FIG. 9 shows a graph of the total sum of achieved power the (solid line) versus the commanded power (the dashed line) over time. If all active loads (loads available for control) are continuously controllable, the power command will be tracked virtually exactly, materializing the equality constraint (eq. 2). However, in the presence of discrete loads, exact tracking of the power commands may not be possible. Thus, the tracking depends on the number of loads of each type, the parameters of each load and the commanded power value.

The power tracking requirement in this case is that the total sum of building powers tracks the power command as closely as possible without exceeding the power command. In this example, at each sampling time, the power of discrete loads that are not active are assigned first, and the sum of power of such subset of loads is subtracted from the overall power command to get the sum of powers that need to be matched by the active loads (which itself is a mixture of continuous and discrete loads).

Figure 8:
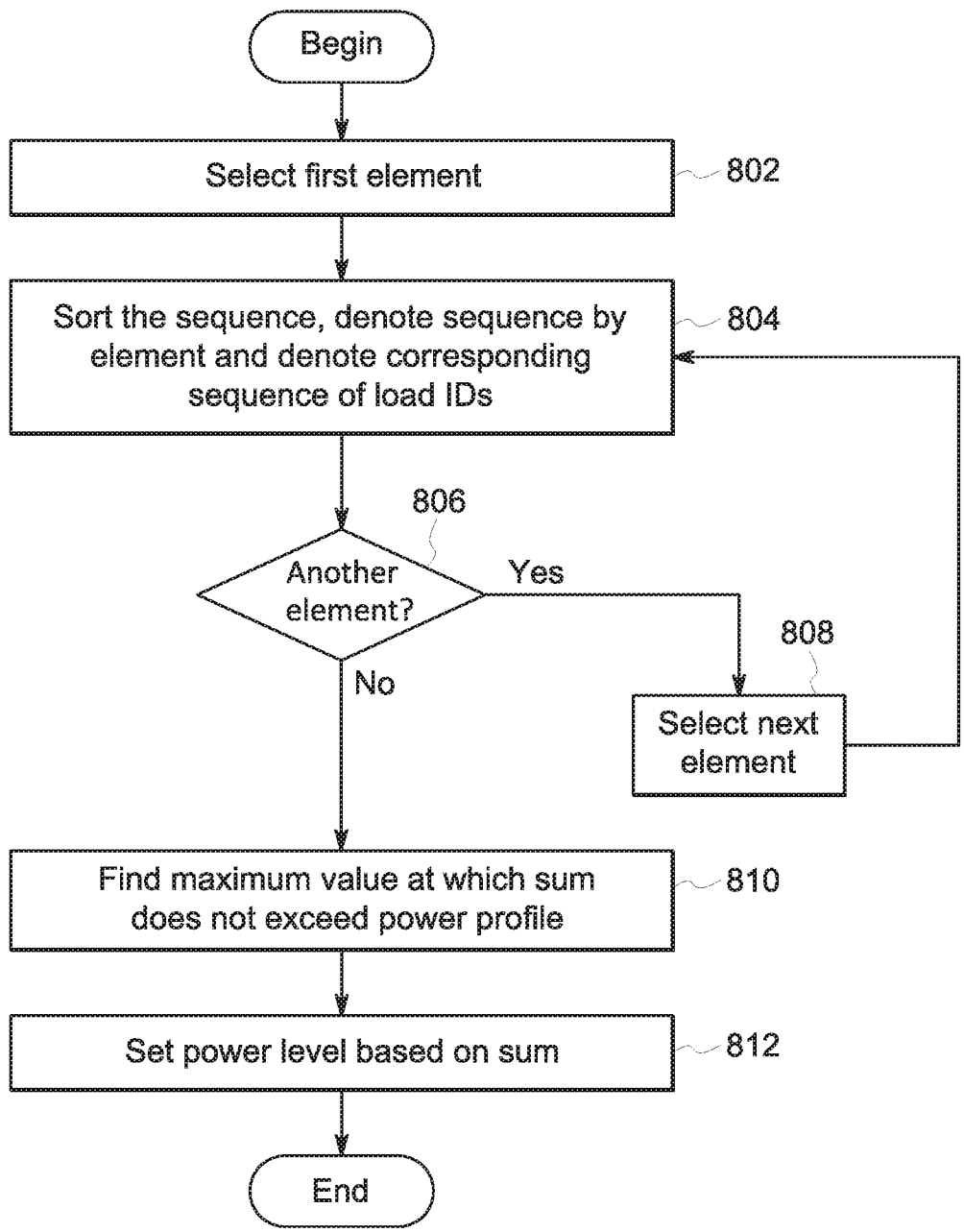
FIG. 8 is a flow diagram showing exemplary operations for controlling a discrete load.

After solving the optimization problem, the discrete active loads are post-processed using the algorithm described herein with reference to FIG. 8. As shown in FIG. 9, the sum of load powers never exceeds the command, which is expected. The RMS value of the relative power tracking error for this simulation is 2.32%. The number of active loads and their individual power set points are automatically computed by the optimization algorithm at each sampling time. Note that at the beginning, the discrete loads are OFF, and because they have to remain OFF to fulfill the hysteresis requirement, at the first four sampling times, only the fifty continuous loads are active.

Figure 10:
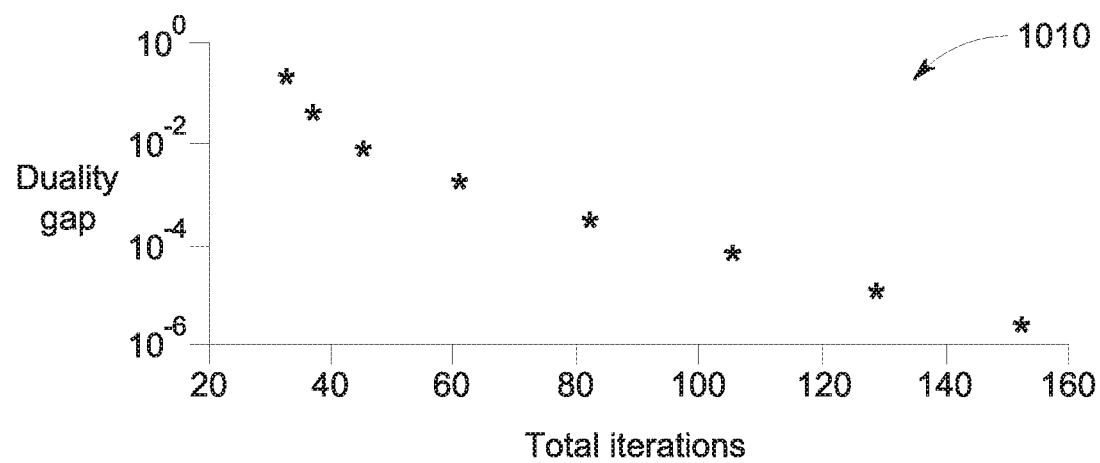
FIG. 10 is a graphical representation of duality gap changes for optimizations over a number of iterations, which may be used to determine sufficient convergence.
Figure 11:
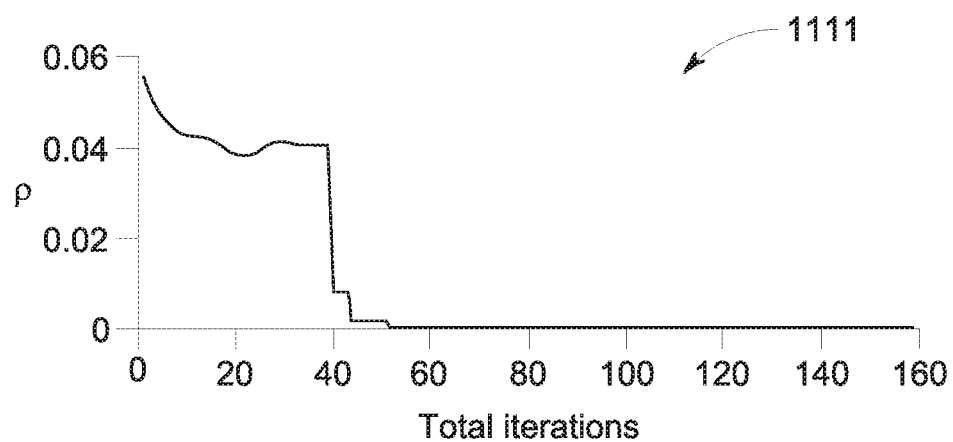
FIG. 11 is a graphical representation of Lagrange multiplier value changes for optimizations over a number of iterations, which may be used to determine sufficient convergence.

In terms of convergence performance, in graph 1010 of FIG. 10 convergence via the duality gap (the difference between the primal and dual solutions) is shown. In graph 1111 of FIG. 11, the values of $\rho$ (the Lagrange multiplier associated with power balance) versus the total number of iterations in an optimization problem is shown as solved within one sampling time. The convergence criterion can be established based on either the duality gap or rate of change of $\rho$, for example.

As can be seen, the technology provides an optimization algorithm for cooperation of distributed flexible power resources to provide regulation and ramping reserve as an ancillary service. This may facilitate the penetration of renewable energies. The distributed iterative operations make real-time distributed optimization feasible, with the target aggregated power being achieved while not significantly impacting the local operation of the distributed flexible power resources. The scalable optimal flexibility control distributes the computational burden of large scale optimization among loads/nodes while they communicate with the aggregator. The technology is highly efficient and can be implemented at the commercial aggregator level with a very large number of loads.

As described above, aggregator 116 receives commanded power profiles from ISO 118. In many situations, it is desirable to rapidly initiate a response to commanded power profiles received from ISO 118. For example, government regulations (e.g., Department of Energy requirements) may mandate that a response be initiated within a predetermined period of time.

Accordingly, the systems and methods described herein further enable initiating a rapid response to a commanded power profile received from ISO 118. The techniques described herein may be used in both synchronous systems (in which ISO 118 communicates with aggregator 116 according to a predetermined schedule (e.g., periodically)) and asynchronous systems (in which ISO 118 can communicate with aggregator 116 at any time). Further, these techniques ensure that a response is initiated within a predetermined period of time (e.g., 5 seconds) from receipt of commanded power profile.

Specifically, in the exemplary embodiment, aggregator 116 receives a commanded power profile from ISO 118. The commanded power profile includes a commanded power deviation, $\Delta P_{target}$. At each sampling time, the distributed optimization algorithm (described above) determines a total power command, $P_{target}$. Specifically, the total power command is calculated as the sum of a nominal power, $P_{nominal}$ (which is itself a sum of the nominal powers at each node load) and the commanded power deviation. Specifically, the total power command is expressed as:

$$P_{target}[k] = \Sum_{i=1}^{N} P_{nominal}^{i}[k] - \Delta P_{target}[k] \quad (18)$$

where the minus sign represents a positive power command deviation from the perspective of ISO 118 (e.g., for a down-reserve situation). During the kth sampling time, the optimization problem is solved, and the results (i.e., power setpoints for each node 102) are implemented at sampling time k+1.

For each cycle, to initiate the rapid response to the command power profile, prior to implementing the optimization results, aggregator 116 checks whether the commanded power deviation, $\Delta P_{target}$, received from ISO 118 is nonzero. If the commanded power deviation is nonzero, a score is calculated for each node 102 in the system. In the exemplary embodiment, the score for each node 102 is calculated based on the distance between the current operating power of that node 102 (i.e., the current operating power for the load 110 associated with that node 102) and upper and lower power limits for that node 102. Each node 102 may have different upper and lower power limits. Alternatively, at least some nodes 102 may have the same upper and lower power limits.

For example, in one embodiment, a normalized score is calculated for each node 102. Specifically, for each node 102, if the current operating power is at the lower power limit, the score is set to −1, if the current operating power is at the upper power limit, the score is set to +1, and if the current operating power is equidistant between the lower power limit and the upper power limit, the score is set to 0. For example, if a particular node 102 has an upper power limit of 100 kilowatts (kW), a lower power limit of 50 kW, and a current operating power of 75 kW, the score for that node 102 would be 0.

After calculating a score for each node 102, aggregator 116 selects a subset of nodes 102 based on the calculated scores. Specifically, in the exemplary embodiment, aggregator 116 selects a first predetermined fraction of the overall number of nodes 102 that have a score closest to 0 (i.e., that are the furthest from their upper and lower power limits). For example, if there are 10,000 nodes 102, and the first predetermined fraction is 1/20, aggregator 116 will select the 500 nodes 102 with a score closest to 0. Selecting nodes 102 with scores closest to 0 facilitates ensuring that subsequent power adjustments (described below) do not cause a particular node 102 to exceed its upper power limit or drop below its lower power limit. In the exemplary embodiment, only nodes 102 with continuous loads 110 will be included in the subset, as nodes 102 with discrete loads 110 will have scores closer to −1 or +1. Further, to facilitate selecting the subset, aggregator 116 may sort nodes 102 by score prior to selecting the sub set.

Once the subset of nodes 102 is selected, aggregator 116 commands each node 102 in the subset to adjust its current operating power (i.e., the operating power for the load 110 associated with that node 102) by a predetermined amount to move the system towards the total power command, $P_{target}$. Specifically, in the exemplary embodiment, a power adjustment is applied to nodes 102 in the subset such that an overall power change of the system is a second predetermined fraction of the commanded power deviation, $\Delta P_{target}$. For example, if the commanded power deviation is 100 kW, and the second predetermined fraction is 1/5, then a power adjustment would be applied to nodes 102 in the subset such that the overall power change of the system is 20 kW.

In some embodiments, the overall power change is evenly distributed between nodes 102 in the subset (i.e., each node 102 has an equal power adjustment). Alternatively, the individual power adjustment for each node 102 in the subset may be weighted (e.g., as a function of the current operating power of each node 102 and/or the calculated score for each node 102). Those of skill in the art will appreciate that the overall power change may be distributed among nodes 102 in the subset using any appropriate technique.

The first predetermined fraction (used to select the subset of nodes 102) and the second predetermined fraction (used to determine the power adjustment for each node 102 in the subset) are adjustable parameters that can be tuned to control operation of the system. In one example, the first predetermined fraction is 1/10 and the second predetermined fraction is 2/5. Alternatively, the first and second predetermined fractions may have any values that enable the system to function as described herein.

Figure 12:
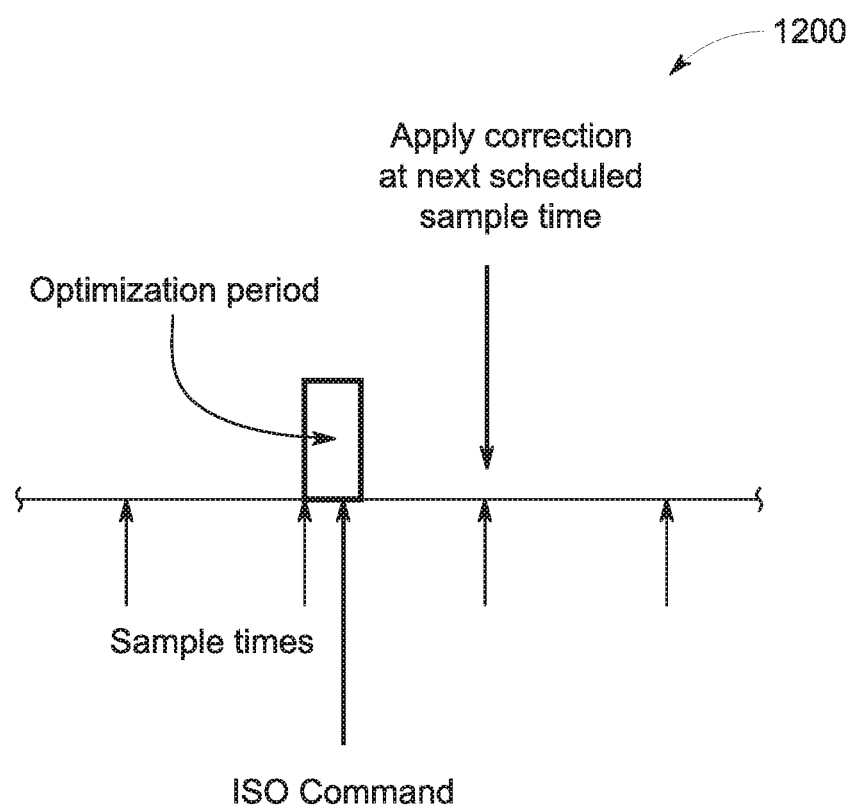
FIG. 12 is a timing diagram illustrating rapid response functionality of an aggregator in a synchronous system.

FIG. 12 is a timing diagram 1200 illustrating the rapid response functionality of aggregator 116 in a synchronous system (i.e., in which ISO 118 communicates with aggregator 116 according to a predetermined schedule). As shown in FIG. 12, sample times occur at regular intervals. At each sample time, an optimization period is initiated, during which the distributed optimization algorithm (described above) determines a total power command and solves the current optimization problem to determine commands for each node 102.

As shown in FIG. 12, an ISO command is received at aggregator 116 from ISO 118 between sample times. Although the ISO command is shown as being received during the optimization period, alternatively, the ISO command may be received after the optimization period.

Once the ISO command is received, aggregator 116 calculates scores, selects a subset of nodes 102, and determines the power adjustment for each node 102 in the subset. Then, at the next sample time, aggregator 116 commands nodes 102 in the subset to execute their respective power adjustment. In this embodiment, the time between sample times is less than or equal to the predetermined period of time within which a response must be initiated (e.g., as specified by government regulations). Accordingly, because the power adjustments are made at the next sample time after the ISO command is received, the power adjustments are always made within the predetermined period of time.

Figure 13:
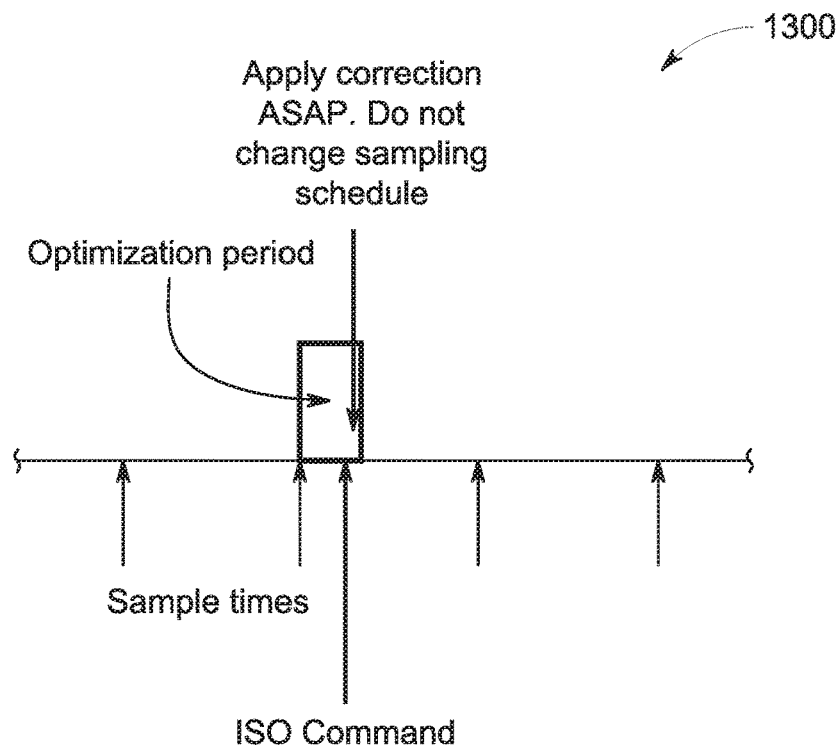
FIG. 13 is a timing diagram illustrating rapid response functionality of an aggregator in an asynchronous system.

FIG. 13 is a timing diagram 1300 illustrating the rapid response functionality of aggregator 116 in an asynchronous system (in which ISO 118 can communicate with aggregator 116 at any time). Similar to timing diagram 1200, as shown in FIG. 13, an ISO command is received at aggregator 116 from ISO 118 between sample times, and during the optimization period.

In this embodiment, however, after aggregator 116 calculates scores, selects a subset of nodes 102, and determines the power adjustment for each node 102 in the subset, aggregator 116 immediately commands nodes 102 nodes 102 in the subset to execute their respective power adjustment (i.e., without waiting until the next sample time). If the current optimization problem has already converged, the load power adjustments are applied on top of the converged optimal values; otherwise, the load power adjustments are applied over the latest power values within the convergence sequence. Also, in this embodiment, the sample times are not shifted, or reset, based on the execution of the power adjustments.

Figure 14:
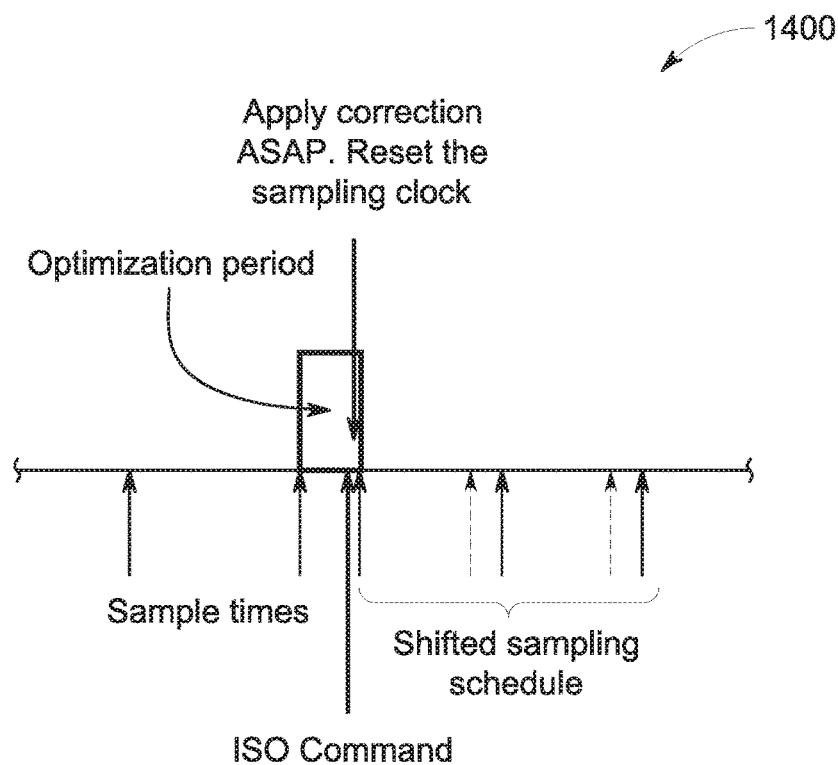
FIG. 14 is a timing diagram illustrating rapid response functionality of an aggregator in an asynchronous system in which sample times are reset.

In contrast, FIG. 14 is a timing diagram 1400 illustrating the rapid response functionality of aggregator 116 in an asynchronous system in which the sample times are reset based on the execution of the power adjustments. Similar to timing diagrams 1200 and 1300, as shown in FIG. 14, an ISO command is received at aggregator 116 from ISO 118 between sample times, and during the optimization period. Then, similar to timing diagram 1300, after aggregator 116 calculates scores, selects a subset of nodes 102, and determines the power adjustment for each node 102 in the subset, aggregator 116 immediately commands nodes 102. In this embodiment, however, the sample times are shifted, or reset, to align with the execution of the power adjustments, as shown in FIG. 14. Immediately following the power adjustment action, a new optimization is started, in preparation for the next sample time. Relative to the embodiment shown in FIG. 13, this embodiment is simpler from an implementation standpoint, but is computationally more demanding, especially for systems including a larger number of loads 110.

In the embodiments described herein, inequality constraints remain feasible, so adjusting power values during optimization will not violate any inequality constraints. The total overall power moves towards the total power command relatively rapidly, and sum of power quality constraints is achieved in the next sampling time. Further, in some embodiments, if the ISO command is received during the optimization, instead of examining the current power of the loads, aggregator 116 analyzes a history of computer power profiles for each node 102 (within the last sampling period), and chooses a power value that is closest to meeting the total power command before calculating scores, selecting a subset of nodes, and commanding each node in the subset.

In some situations, the total power command may be infeasible (e.g., if the total power command is greater than the sum of the maximum powers for all nodes 102). Under such circumstances, the total power command is adjusted to the closest feasible total power, and an alert is generated by aggregator 116 (i.e., to notify a user).

The systems and methods described herein were simulated using a system of 100 distributed nodes/loads. The first and second predetermined fractions were set such that, in response to a commanded power deviation, $\Delta P_{target}$, the 10 middle nodes were adjusted by 20% each. Without the rapid response functionality described herein, there is necessarily a one-sample delay to initiate the response. In contrast, with the rapid response functionality, aggregator 116 initiates a response substantially immediately.

Figure 15A:
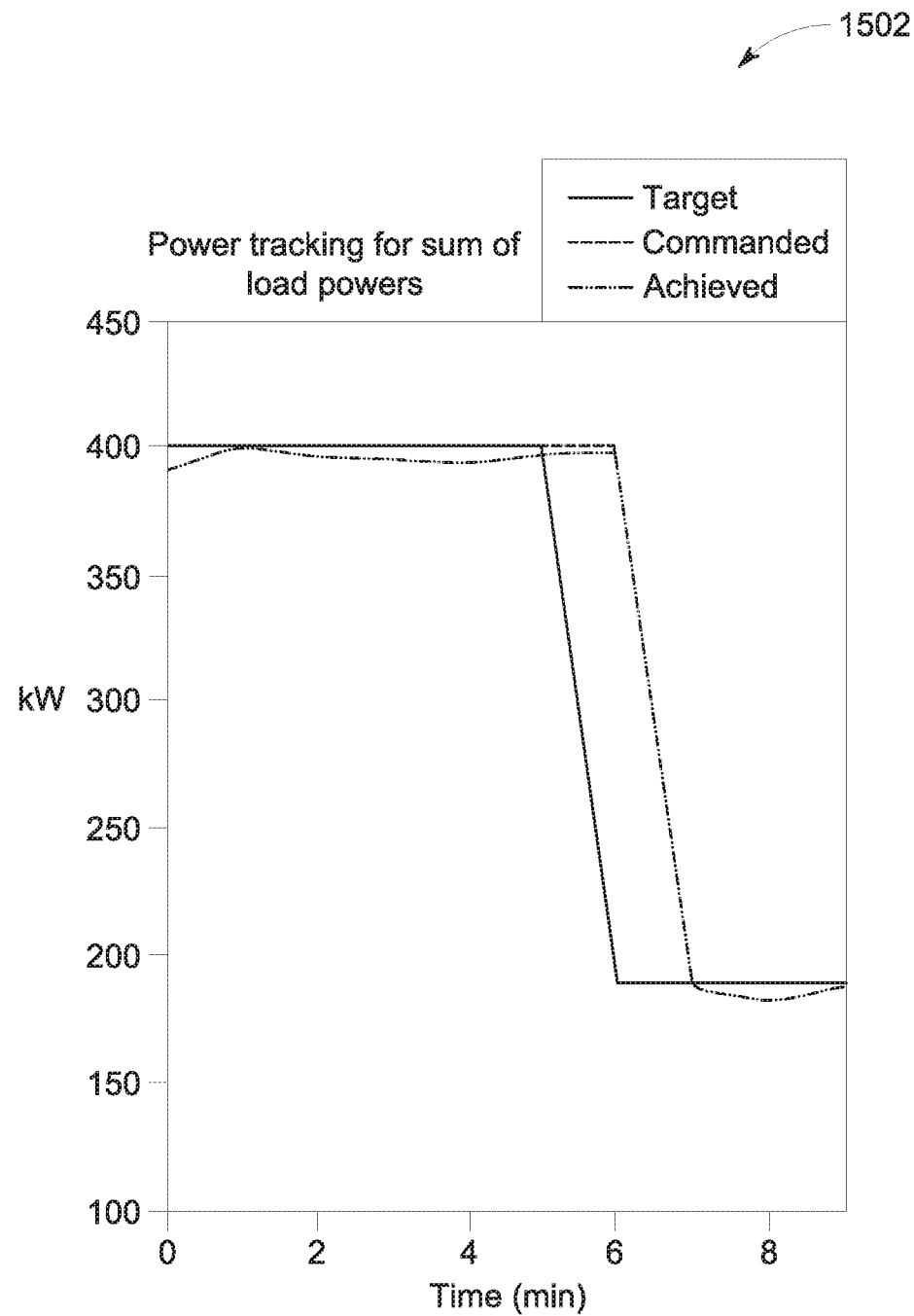
FIG. 15A is a graph showing a system response without rapid response functionality.
Figure 15B:
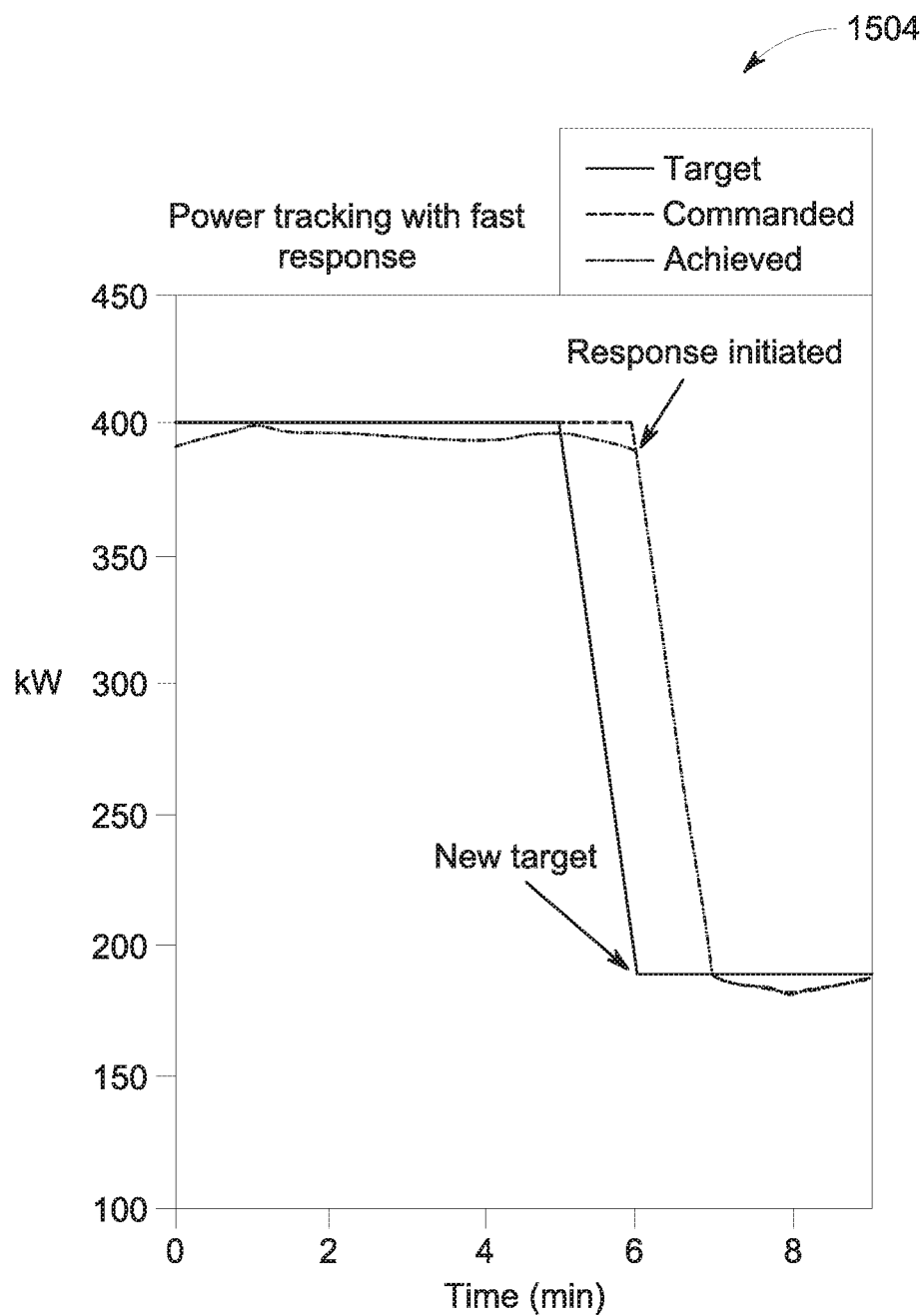
FIG. 15B is a graph showing a system response with rapid response functionality.

FIG. 15A is a graph 1502 showing the simulated system response without the rapid response functionality, and FIG. 15B is a graph 1504 showing the simulated system response with the rapid response functionality. In FIGS. 15A and 15B, the "Target" curve is $P_{target}$, the commanded power to be tracked, and the "Achieved" curve is the command visible to aggregator 116, which has a one-step delay. As shown in FIG. 15A, without the rapid response functionality, $P_{target}$ changes at 6 minutes, but a response is not initiated until 7 minutes. However, as shown in FIG. 15B, using the rapid response functionality, an immediate corrected response is initiated at 6 minutes, and tracking is achieved at 7 minutes. Notably, if future values of $\Delta P_{target}$ are known (which is generally the case), immediate response initiation is provided as well.

Figure 16:
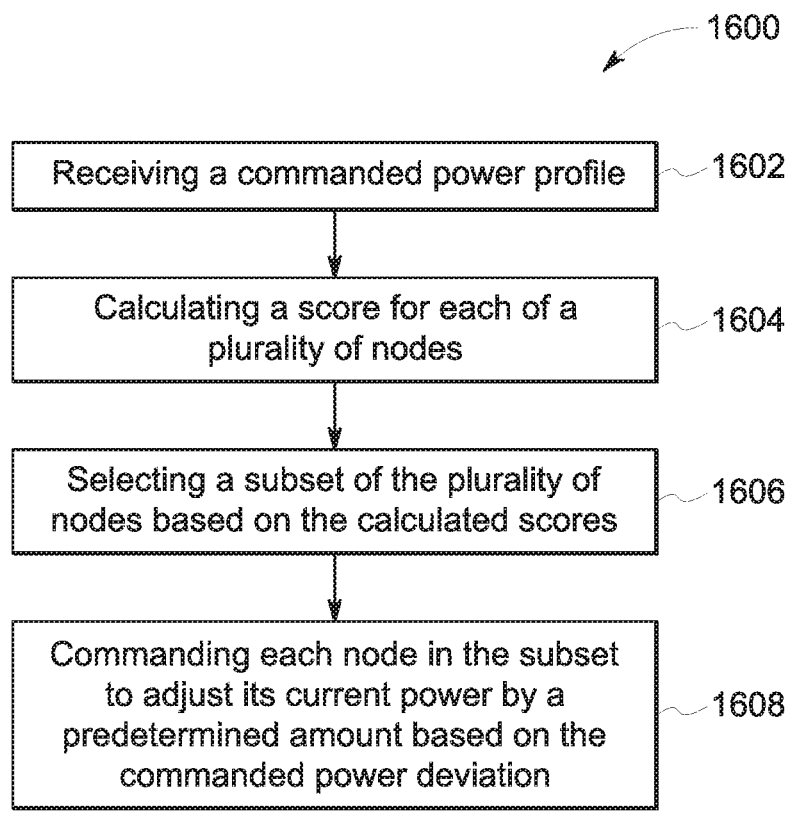
FIG. 16 is a flow diagram of an exemplary method for rapidly responding to a commanded power profile.

FIG. 16 is a flow diagram of an exemplary method 1600 for rapidly responding to a commanded power profile. The steps of method 1600 may be implemented, for example, using aggregator 116. Method 1600 includes receiving 1602, from an ISO, such as ISO 118 (shown in FIG. 1), a commanded power profile including a commanded power deviation. Method 1600 further includes calculating 1604 a score for each of a plurality of nodes. The score may be calculated 1604, for example, based on a distance between the current operating power of the node and upper and lower power limits for the node.

Additionally, method 1600 includes selecting 1606 a subset of the nodes based on the calculated scores. Then, method 1600 includes commanding 1608 each node in the selected subset to adjust its current power by a respective predetermined amount based on the commanded power deviation.

The embodiments described herein include systems and methods for implementing rapid response functionality in a distributed power system. An aggregator receives a commanded power profile from an independent service operator, the commanded power profile including a commanded power deviation for the distributed power system. The aggregator further calculates a score for each of a plurality of nodes based on a current operating power of each node, and selects a subset of the plurality of nodes based on the calculated scores. Further, the aggregator commands each node in the subset to adjust its current power by a respective predetermined amount, the predetermined amounts determined based on the commanded power deviation.

An exemplary technical effect of the methods, systems, and apparatus described herein includes at least one of: (a) reducing power mismatch in response to ISO commanded power profiles; (b) reducing power tracking error; (c) improving compliance with regulatory requirements; and (d) improving power tracking in both synchronous and asynchronous systems.

Exemplary embodiments for implementing rapid response functionality in a distributed power system are described herein. The systems and methods of operating and manufacturing such systems and devices are not limited to the specific embodiments described herein, but rather, components of systems and/or steps of the methods may be utilized independently and separately from other components and/or steps described herein. For example, the methods may also be used in combination with other electronic systems, and are not limited to practice with only the electronic systems, and methods as described herein. Rather, the exemplary embodiment can be implemented and utilized in connection with many other electronic systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling a distributed power system including an aggregator communicatively coupled to a plurality of nodes, each of the plurality of nodes including an associated load, said method comprising:

receiving, at the aggregator, a commanded power profile from an independent service operator, the commanded power profile including a commanded power deviation for the distributed power system;

calculating, using the aggregator, a score for each of the plurality of nodes based on a current power of each node, the score indicating a distance between the current power for the node and a midpoint between upper and lower power limits for the node;

selecting, using the aggregator, a subset of the plurality of nodes based on the calculated scores; and commanding, using the aggregator, each node in the subset to adjust its current power by a respective predetermined amount, the predetermined amounts determined based on the commanded power deviation.

2. The method of claim 1, wherein calculating a score for each of the plurality of nodes comprises calculating a score based on a distance between the current power for the node and upper and lower power limits for that node.

3. The method of claim 1, wherein selecting a subset of the plurality of nodes comprises selecting a first predetermined fraction of the overall number of nodes.

4. The method of claim 1, wherein the respective predetermined amounts are determined such that a sum of the predetermined amounts is equal to a second predetermined fraction of the commanded power deviation.

5. The method of claim 1, wherein the respective predetermined amounts are equal to one another.

6. The method of claim 1, wherein receiving a commanded power profile comprises receiving the commanded power profile after a first sample time, and wherein commanding each node in the subset to adjust its current power comprises commanding each node in the subset to adjust its current power at a second sample time that is consecutive to the first sample time.

7. The method of claim 1, wherein receiving a commanded power profile comprises receiving the commanded power profile after a first sample time, and wherein commanding each node in the subset to adjust its current power comprises commanding each node in the subset to adjust its current power immediately after the predetermined amounts have been determined.

8. The method of claim 7, further comprising shifting a second sample time that is consecutive to the first sample time to align with a time when each node in the subset is commanded to adjust its current power.

9. A distributed power system comprising:
a plurality of nodes, each node comprising an associated load; and
an aggregator communicatively coupled to said plurality of nodes, said aggregator configured to:
receive a commanded power profile from an independent service operator, the commanded power profile including a commanded power deviation for said distributed power system;
calculate a score for each of said plurality of nodes based on a current power of each node, the score indicating a distance between the current power for the node and a midpoint between upper and lower power limits for the node;
select a subset of said plurality of nodes based on the calculated scores; and
command each node in the subset to adjust its current power by a respective predetermined amount, the predetermined amounts determined based on the commanded power deviation.

10. The distributed power system of claim 9, wherein to calculate a score, said aggregator is configured to calculate a score based on a distance between the current power for the node and upper and lower power limits for that node.

11. The distributed power system of claim 9, wherein to select a subset, said aggregator is configured to select a first predetermined fraction of the overall number of nodes.

12. The distributed power system of claim 9, wherein the respective predetermined amounts are determined such that a sum of the predetermined amounts is equal to a second predetermined fraction of the commanded power deviation.

13. The distributed power system of claim 9, wherein the respective predetermined amounts are equal to one another.

14. The distributed power system of claim 9, wherein to receive a commanded power profile, said aggregator is configured to receive the commanded power profile after a first sample time, and wherein to command each node in the subset, said aggregator is configured to command each node in the subset to adjust its current power at a second sample time that is consecutive to the first sample time.

15. The distributed power system of claim 9, wherein to receive a commanded power profile, said aggregator is configured to receive the commanded power profile after a first sample time, and wherein to command each node in the subset, and said aggregator is configured to command each node in the subset immediately after the predetermined amounts have been determined.

16. An aggregator for controlling a distributed power system, said aggregator communicatively coupled to a plurality of nodes each including an associated load, said aggregator comprising:
a memory device; and
a processor communicatively coupled to said memory device, said processor configured to:
receive a commanded power profile from an independent service operator, the commanded power profile including a commanded power deviation for the distributed power system;
calculate a score for each of the plurality of nodes based on a current power of each node, the score indicating a distance between the current power for the node and a midpoint between upper and lower power limits for the node;
select a subset of the plurality of nodes based on the calculated scores; and
command each node in the subset to adjust its current power by a respective predetermined amount, the predetermined amounts determined based on the commanded power deviation.

17. The aggregator of claim 16, wherein to calculate a score, said processor is configured to calculate a score based on a distance between the current power for the node and upper and lower power limits for that node.

18. The aggregator of claim 16, wherein to select a subset, said processor is configured to select a first predetermined fraction of the overall number of nodes.

19. The aggregator of claim 16, wherein the respective predetermined amounts are determined such that a sum of the predetermined amounts is equal to a second predetermined fraction of the commanded power deviation.

20. The aggregator of claim 16, wherein to receive a commanded power profile, said processor is configured to receive the commanded power profile after a first sample time, and wherein to command each node in the subset, said processor is configured to command each node in the subset immediately after the respective predetermined amounts have been determined.

* * * * *